US012779965B2

(12) United States Patent
Guellec

(10) Patent No.: US 12,779,965 B2
(45) Date of Patent: Nov. 3, 2026

(54) ENCAPSULATED FIXED WINDOW MODULE FOR A MOTOR VEHICLE

(71) Applicant: HUTCHINSON SEALING SYSTEMS, INC., Auburn Hills, MI (US)

(72) Inventor: André Guellec, Bloomfield Hills, MI (US)

(73) Assignee: HUTCHINSON SEALING SYSTEMS, INC.

( * ) Notice: Subject to any disclaimer, the term of this patent is extended or adjusted under 35 U.S.C. 154(b) by 444 days.

(21) Appl. No.: 18/327,294

(22) Filed: Jun. 1, 2023

(65) Prior Publication Data

US 2024/0399843 A1 Dec. 5, 2024

(51) Int. Cl.

| | |
|---|---|
| ***B60J 10/79*** | (2016.01) |
| ***B60J 1/10*** | (2006.01) |
| ***B60J 1/12*** | (2006.01) |
| ***B60J 10/23*** | (2016.01) |
| ***B60J 10/27*** | (2016.01) |
| ***B60J 10/76*** | (2016.01) |

(52) U.S. Cl.

CPC ................. *B60J 10/79* (2016.02); *B60J 1/12* (2013.01); *B60J 10/27* (2016.02); *B60J 10/76* (2016.02); *B60J 1/10* (2013.01); *B60J 10/23* (2016.02)

(58) Field of Classification Search

CPC ....... B60J 1/08; B60J 1/085; B60J 1/10; B60J 1/12; B60J 1/16; B60J 1/17

USPC ........................................................ 296/146.1

See application file for complete search history.

(56) References Cited

U.S. PATENT DOCUMENTS

| | | | |
|---|---|---|---|
| 4,653,230 | A | 3/1987 | Seo |
| 4,662,113 | A | 5/1987 | Weaver |
| 4,932,161 | A | 6/1990 | Keys |
| 5,846,463 | A | 12/1998 | Keeney |
| 6,220,650 | B1 | 4/2001 | Davis |

(Continued)

FOREIGN PATENT DOCUMENTS

| | | | | |
|---|---|---|---|---|
| EP | 0195578 A1 | 8/1990 | | |
| EP | 3623191 A1 | 3/2020 | | |
| JP | 7475822 B2 * | 4/2024 | .............. | B60J 10/76 |

OTHER PUBLICATIONS

European Extended Search Report received for EP Serial No. 23202991 on Feb. 26, 2024, 2 pgs.

*Primary Examiner* — Amy R Weisberg
*Assistant Examiner* — Philip C Adams
(74) *Attorney, Agent, or Firm* — Merchant & Gould P.C.

(57) ABSTRACT

An encapsulated fixed window module for a motor vehicle includes a fixed window pane, a first division post profile defining a longitudinal groove configured to receive a guide carried by a movable window pane. An exterior wall faces a fixed pane interior surface, and an over-molded material secures the first division post profile to the fixed window pane. The over-molded material has a first over-molded portion extending between the division post exterior wall and the fixed pane interior surface and a second over-molded portion extends between the lateral wall and the interior surface. The first portion is in contact with at least one protruding lip which is located between the exterior wall and the interior surface, the at least one protruding lip being compressed and elastically deformed between the exterior wall and the interior surface to prevent mold bleeds.

30 Claims, 16 Drawing Sheets

(56) References Cited

U.S. PATENT DOCUMENTS

| | | | | |
|---|---|---|---|---|
| 6,571,513 | B2 | 6/2003 | Maass | |
| 6,643,984 | B2 | 11/2003 | Kato | |
| 10,457,121 | B2 | 10/2019 | Tallent | |
| 11,059,360 | B2 * | 7/2021 | Guellec | B60J 10/79 |
| 11,780,300 | B2 | 10/2023 | Hatta | |
| 12,179,562 | B2 * | 12/2024 | Baratin | B60R 13/04 |
| 2018/0141421 | A1 * | 5/2018 | Blottiau | B60J 10/74 |
| 2020/0180405 | A1 * | 6/2020 | Blottiau | B60J 10/265 |
| 2024/0399843 | A1 | 12/2024 | Guellec | |

* cited by examiner

A1-A1

A2-A2

C-C

B-B

ENCAPSULATED FIXED WINDOW MODULE FOR A MOTOR VEHICLE

TECHNICAL FIELD

The present invention relates generally to an encapsulated fixed window module for a motor vehicle and such a motor vehicle.

BACKGROUND OF THE INVENTION

In a number of motor vehicles, a door assembly is designed such that there is a first, e.g., forward, window opening that carries a movable window pane and a second, e.g., rearward, opening that is equipped with a fixed or stationary window pane. Of course, the forward window pane may be fixed and the rearward window pane may be moveable. Fixed windows of conventional design may be assembled from discrete elements that include the window panel, a post that serves as a track for an adjacent movable window and various configurations of moldings or trim pieces or division posts, most specifically an extruded header/B-pillar trim piece that may be mechanically attached to the window module assembly using an interlocking channel or the like.

The division post in some prior art designs comprises an article in the nature of a pre-formed resilient band. In those designs, the window is inserted into a channel of the trim band which resiliently engages the window pane, but often less than securely. Conventional designs suffer from a number of deficiencies due to their assembly from discrete components such as water leakage, noise from the exterior (wind noise) or the interior, and problems generally with fit and finish. In addition, the assembly of these modules is often difficult, particularly where the individual components are manufactured by more than one supplier.

A few of the problems of conventional designs are overcome through the use of over-molding processes by which a portion of the trim or post surrounding the window pane is fabricated by encapsulating the window periphery with a polymer using injection molding techniques. In essence, the window pane is placed in a mold cavity which is configured to produce a circumferential trim at the pane edges. A division post profile and a header profile are also placed in the mold cavity. In some cases, an additional margin seal extrusion can be added to the mold cavity. The edges of the pane on which the injection molded trim will adhere are cleaned and primed to promote adhesion and to create a water-impervious seal in the formed article. The mold is then closed and the material is injected such that the window pane edges are encapsulated to form the desired trim geometry.

FIG. 1 is a cross sectional view of adjacent window panes 1, 2 of a motor vehicle. The window pane 1 is fixed and the window pane 2 is movable. The fixed window pane 1 has an exterior surface 1*a*, an interior surface 1*b*, and a peripheral edge 1*c* extending between said exterior and interior surfaces 1*a*, 1*b*. A division post 3 extends along the peripheral edge 1*c* and is secured thereto by an over-molded material 4.

The division post 3 is U-shaped in cross section and has an exterior wall 3*a*, an interior wall 3*b*, and a lateral wall 3*c* connecting said exterior and interior walls 3*a*, 3*b*. The division post 3 defines a longitudinal groove 5 configured to receive a portion of the movable window pane 2. The lateral wall 3*c* of the division post 3 is in abutment against the peripheral edge 1*c* of the fixed window pane 1 and said over-molded material 4 comprises a first portion 4*a* extending between the lateral wall 3*c* and the exterior surface 1*a*, and a second portion 4*b* extending between the lateral wall 3*c* and the interior surface 1*b*.

This configuration creates a small offset O between the interior surface 1*b* and the interior wall 3*b* and requires limited amount of over-molded material on both sides of the fixed window pane 1. The risk of appearance issue due to sink marks is therefore low.

The exterior appearance of the window modules is very important for the customer, i.e., the user of the motor vehicle. A solution for enhancing the appearance of a window module is to provide the periphery of the window pane with finished panels which are located outside the motor vehicle and are visible by the user. Said finished panels are for instance esthetic metal components which are secured to the window module.

It is also known to enhance the esthetic appearance of a window module by lying flush the outside of its stationary window pane with the outside of an adjacent movable window pane.

FIG. 2 is a cross sectional view of adjacent and flush window panes 1, 2 of a motor vehicle. The division post 3 extends along the peripheral edge 1*c* and is secured to the interior surface 1*b* by an over-molded material 4.

The division post 3 defines a longitudinal groove 5 configured to receive a guiding mean 6 carried by the movable window pane 2. The exterior wall 3*a* of the division post 3 faces the interior surface 1*b* and is secured thereto by the over-molded material 4.

The over-molded material 4 comprises a first portion 4*a* extending between the exterior wall 3*a* and the interior surface 1*b* and a second portion 4*b* extending between the lateral wall 3*c* and the interior surface 1*b*. FIG. 2 shows that the first portion 4*a* has a thickness E1 which is constant (the thickness, E1 being measured in a direction D1 perpendicular to the interior surface 1*b* and/or to the exterior wall 3*a*). On the contrary, the second portion 4*b* has a bigger thickness E2 which is not constant and which varies (the thickness, E2 is measured in a direction D2 perpendicular to the lateral wall 3*c*). The thickness E2 of the second portion 4*b* is higher in the proximity of the interior surface 1*b* than on the opposite end in the proximity of the interior wall 3*b*.

The over-molded material 4 comprises an outer face 4*c* which extends between the lateral wall 3*c* and the interior surface 1*b* and which includes a major portion 4*c*1 which is inclined with respect to the interior surface 1*b*. Due to feasibility reasons, it is not possible to get a major portion 4*c*1 perpendicular to the interior surface 1*b* during the over-molding process.

In this flush configuration, a large offset O is created between the interior surface 1*b* and the interior wall 3*b* and a large amount of over-molded material 4 is needed to fill this offset O. The risk of appearance issue due to sink marks is therefore high. Indeed, after de-molding, the over-molded material 4 cools and hardens. The large amount of over-molded material promotes the formation of sink marks and surface defects on the outer face 4*c*. Since this outer face 4*c* may be visible to the user of the motor vehicle, these sink marks and surface defects are problematic.

The present invention provides at least an encapsulated fixed window module which can be used in a flush configuration and which avoids at least some of the above-mentioned issues.

SUMMARY OF THE INVENTION

According to the invention there is provided an encapsulated fixed window module for a motor vehicle, comprising:

a fixed window pane having an exterior surface, an interior surface, and a peripheral edge extending between said exterior and interior surfaces, at least one division post extending along at least a portion of said peripheral edge, said division post comprising a first longitudinal profile which is U-shaped in cross section and which has an exterior wall, an interior wall, and a lateral wall connecting said exterior and interior walls, said first profile defining a longitudinal groove configured to receive a guiding mean carried by a movable window pane, said exterior wall facing said interior surface, and an over-molded material securing said first profile to said fixed window pane, wherein said over-molded material is in contact with at least one protruding lip which is located between said exterior wall and said interior surface, said at least one protruding lip being elastically deformable from a first unconstrained position to a second constrained position in which said at least one protruding lip is elastically deformed, and wherein said at least one protruding lip is compressed between said exterior wall and said interior surface so as to adopt said second position.

In the present specification, the words “inner”, “inside”, “interior”, etc., make reference to the inside of a motor vehicle. The words “outer” “outside”, “exterior”, etc., make reference to the outside of the motor vehicle. Then, an outer element is located at the outer side of the vehicle. A first outer element, portion or surface may be visible by a user of the motor vehicle or may be hidden by a second outer element, portion or surface covering said first outer element.

In the present specification, “aligned” and “substantially aligned” mean that two elements are strictly aligned or are aligned in a range 0 to 5 mm, preferably 0 to 3 mm and more preferably 0 to 1 mm.

The present invention provides a solution for enhancing the esthetic appearance of a fixed window module. This aim is achieved by keeping the thickness of the over-molded material as constant as possible. The second portion of the over-molded material is constant along a major portion of this second portion along a direction perpendicular to the interior surface of the fixed window pane. The thicknesses of the first and second portions of the over-molded material may be similar. Having a consistent thickness allows all the molded areas to cool at the same speed and prevent “sink-marks” and other appearance defects.

The encapsulated fixed window module according to the invention may comprise one or more of the following features, taken alone from each other or in combination with each other:

said at least one protruding lip is carried by said exterior wall;

said at least one protruding lip is carried by said fixed window pane and connected to said interior surface;

said at least one protruding lip includes two, three or four adjacent protruding lips, each of said adjacent protruding lips being elastically-deformable;

said exterior wall is located at a first distance from said interior surface, said first distance being measured in a direction which is perpendicular to said interior surface, said at least one protruding lip has a first height in said first position and a second height in second position, said first and second heights being measured in a direction which is perpendicular to said interior surface, said second height is equal to said first distance, and said first height is greater that said second height and said first distance;

said at least one protruding lip has a cross sectional curved shape and comprises a concave side which is oriented towards the lateral wall and an opposite convex side;

said convex side is aligned and flush with a convex surface of said peripheral edge; in a variant, there is a gap between said convex side and said convex surface of said peripheral edge;

an empty space is defined between said at least one protruding lip and said interior surface;

an empty space is defined between said opposite convex side and said interior surface;

said at least one protruding lip has a cross sectional straight shape and extends perpendicularly to said interior surface;

said at least one protruding lip comprises a securing base and at least one flexible lip extending from said securing base;

said at least one protruding lip comprises a single securing base and a plurality of flexible lips connected to said single securing base;

said at least one protruding lip is overmolded onto said interior surface or onto said exterior wall;

said at least one protruding lip is made of a material of said exterior wall or from one of materials of said exterior wall;

said at least one protruding lip is located at a first end of said exterior wall which is opposite to said lateral wall, or is located at a second end of said exterior wall which is opposite to said first end;

said exterior wall carries a protruding leg which is perpendicular to said exterior wall and which is in abutment against said peripheral edge;

said protruding leg carries a first sealing lip which is configured to abut against a peripheral edge of said movable window pane;

said first sealing lip has a concave surface which is oriented outwardly and opposite to said division post;

said lateral wall comprises a tooth which includes a first surface parallel to said interior surface, and a second surface which is inclined with respect to said interior surface, said first portion extending between said first surface and said interior surface and said second portion extending between said second surface and said interior surface;

said division post or first profile is extruded;

said tooth is co-extruded with said first profile;

said first surface is planar and said second surface is planar or curved;

said second surface is concave or convex;

said second surface is mainly parallel to said outer surface or provides a constant offset when this second surface is concave or convex;

said first and second surfaces are V-shaped in cross section;

said tooth has a tip having an angle comprises between 2° and 85°, and preferably between 5° and 70°;

said over-molded material is V-shaped;

said over-molded material includes a protruding rib extending on the interior surface;

$0.8 \cdot E1 \leq E2 \leq 1.2 \cdot E1$; and preferably $0.9 \cdot E1 \leq E2 \leq 1.1 \cdot E1$; and more preferably $E1 = E2$; $E1$ and $E2$ being respectively said first and second thicknesses;

said division post or first profile comprises an embedded metallic rail which includes a leg extending outwardly and facing said peripheral edge;

the thicknesses of the first and second portions are constant along a major portion of a length of the first profile;

the thickness of the first portion is measured in a direction which is perpendicular to the interior surface of the fixed window pane; this direction may be perpendicular to said exterior wall or to a surface of said exterior wall;

the thickness of the second portion is measured in a direction which is perpendicular to said lateral wall or to a surface of said lateral wall;

the thickness of the first portion is substantially constant when the first profile is viewed in cross section;

the thickness of the second portion is constant when the first profile is viewed in cross section;

said over-molded material does not cover said peripheral edge along said first profile;

said exterior wall of said first profile is applied onto said interior surface;

said exterior wall is L-shaped in cross section and includes first and second parts that are perpendicular one another, said first part being spaced from said interior surface and extending between said lateral wall and said second part, said second part being applied directly onto said interior surface;

said first part defines a space with said interior surface that is filled in with said over-molded material;

said over-molded material extends at least between said exterior and lateral walls and said interior surface;

said interior wall faces said guiding mean and an interior surface of said movable window pane;

said interior wall carries a second sealing lip which is configured to be in sealing contact with said guiding mean;

said interior wall carries a third sealing lip which is configured to be in sealing contact with said movable window pane;

said second and third sealing lips are co-extruded with said first profile;

said exterior wall is coated with an antifriction layer inside said longitudinal groove;

said lateral wall is coated with an antifriction layer inside said longitudinal groove;

said interior wall is coated with an antifriction layer inside said longitudinal groove;

said module may further comprise a second longitudinal profile or retention clips secured onto said interior surface;

said second longitudinal profile is U-shaped in cross section and has an exterior wall connecting therebetween two lateral walls, said second profile defining a longitudinal groove configured to receive a metallic flange of the motor vehicle;

said exterior wall of said second profile is parallel to said interior surface and is secured thereto by an over-molded material, one of said lateral walls of said second profile being substantially aligned with a portion of said peripheral edge in a plane that is perpendicular to said fixed window pane, and the other of said lateral walls of said second profile extending perpendicularly and facing said interior surface;

said exterior wall of said second profile is spaced from said interior surface;

said module further comprises longitudinal segments forming a glass run with said division post;

said module comprises a longitudinal segment which is a third longitudinal (or header) profile which connects therebetween first and second longitudinal profiles;

said first and second profiles are vertical profiles;

said third longitudinal profile extends along at least an upper portion of said peripheral edge of said fixed window pane, and is adjacent to said profile;

said third longitudinal profile comprises first and second U-shaped portions, said first U-shaped portion being configured to receive a metallic flange of the motor vehicle and the second U-shaped portion being configured to receive by sliding said movable window pane;

said module further comprises a longitudinal segment which is a fourth longitudinal profile which is parallel to said second profile and which is connected by molding to an end of said third longitudinal (header) profile;

said first and second U-shaped portions define respectively two longitudinal grooves which are perpendicular one another;

said over-molded material further comprises a third portion which is connected to the first portion and which is interposed between said leg and said peripheral edge;

said over-molded material further comprises a third portion which is connected to the first portion, said third portion extending perpendicularly to the first portion and on said peripheral edge;

said third portion includes an end which is coplanar with said exterior surface of said fixed window pane;

the (co-extruded) material of the tooth may be different from the (co-extruded) material of the first longitudinal profile;

the (co-extruded) material of the protruding lip is different from the (co-extruded) material of the first longitudinal profile;

the (co-extruded) material of the protruding leg may be different from the (co-extruded) material of the first longitudinal profile;

the material(s) of the tooth, and/or the protruding leg, and/or the protruding lip may be softer or less hard than the material of the first longitudinal profile and in particular a covering material of this first longitudinal profile.

The invention further proposes a glass run comprising an encapsulated fixed window module as recited above and first and second extruded segments, said first extruded segment being parallel to said division post, said second extruded segment extending between said encapsulated fixed window module and said first extruded segment and having a first end connected by overmolding to an upper end of said division post and a second end connected by overmolding to an upper end of said first extruded segment.

The glass run may comprise further profiles, and in particular third and fourth profiles, as described above. The invention further proposes a motor vehicle, comprising at least one encapsulated fixed window module or one glass run as defined above.

The motor vehicle may comprise a door including a door frame, a movable window pane, and said encapsulated fixed window module, said movable window pane having an exterior surface, an interior surface, and a peripheral edge extending between said exterior and interior surfaces, wherein said exterior surfaces of said encapsulated fixed window module and of said movable window pane are substantially coplanar or flush.

Advantageously, both exterior surfaces of said encapsulated fixed window module and of said movable window pane are further substantially coplanar or flush with a portion of a first sealing lip interposed between both peripheral edge of said encapsulated fixed window module and of said movable window pane.

BRIEF DESCRIPTION OF THE FIGURES

The invention will be better understood and other details, features and advantages of the invention will appear more clearly on reading the following description given by way of non-limiting examples and with reference to the accompanying drawings in which.

DETAILED DESCRIPTION

Figure 1:
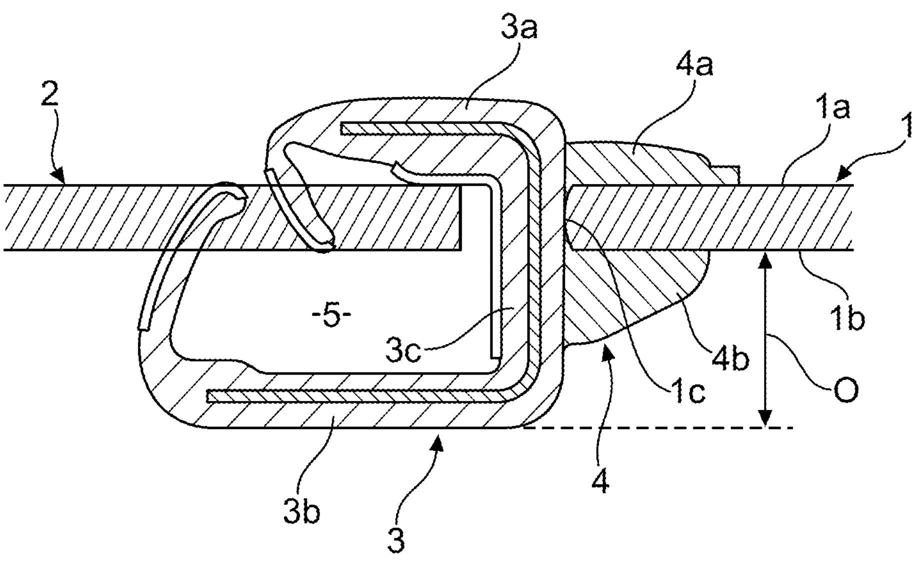
FIG. 1 is a cross sectional view of adjacent window panes including a fixed window pane carrying a division post, and a movable window pane guided into a groove of the division post.
Figure 2:
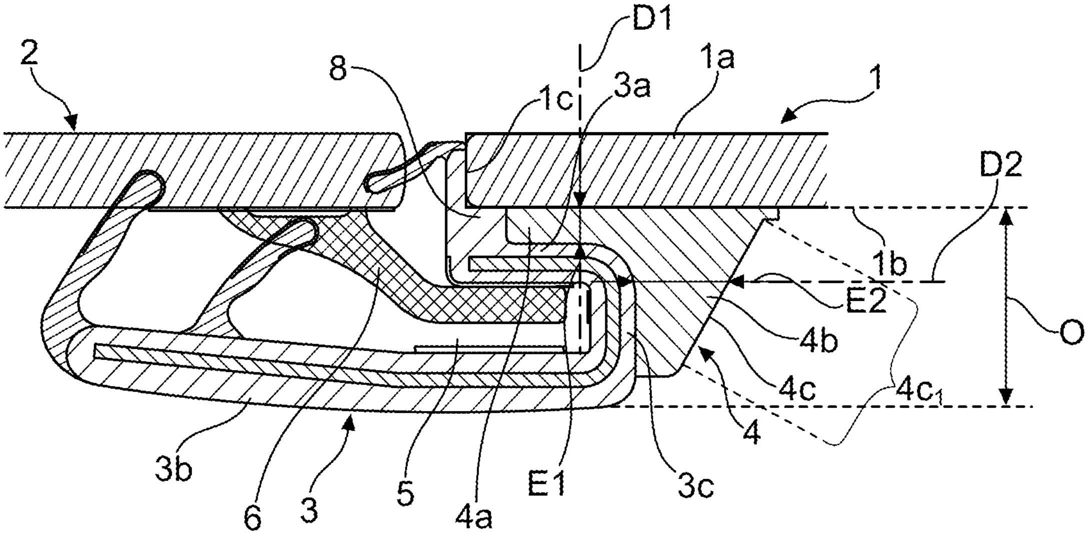
FIG. 2 is a cross sectional view of adjacent and flush window panes including a fixed window pane carrying a division post, and a movable window pane carrying a guiding mean engaged into a groove of the division post.

FIGS. 1 and 2 have been already described and illustrate the prior art.

Figure 3:
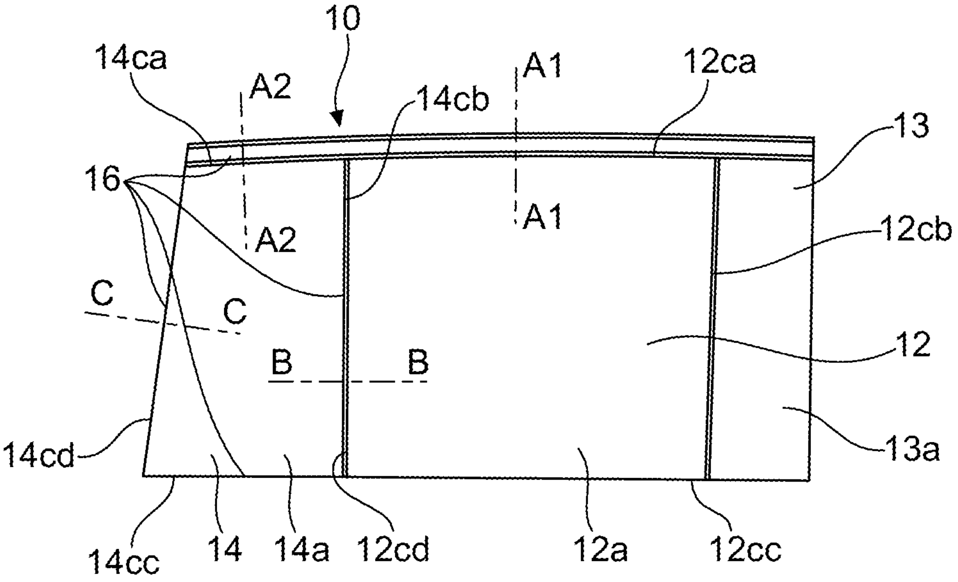
FIG. 3 is a fragmentary side view of an encapsulated fixed window module, in its door environment.

FIG. 3 shows an example of an encapsulated fixed window module 10 for a motor vehicle in its door environment.

A motor vehicle door comprises a door frame provided with an encapsulated fixed window module 10 which can be adjacent to a movable window pane 12. In the example of FIG. 1, a rear door of a vehicle is shown in which case the pane 12 is a forward pane and the module 10 is a rearward module. Another configuration would be on a front door, with in that case the movable window pane 12 positioned rearwardly from the module 10.

The module 10 includes at least a fixed window pane 14 molded on up to four extremities or along four edges. The or each molding forms an encapsulation 16.

Figure 4:
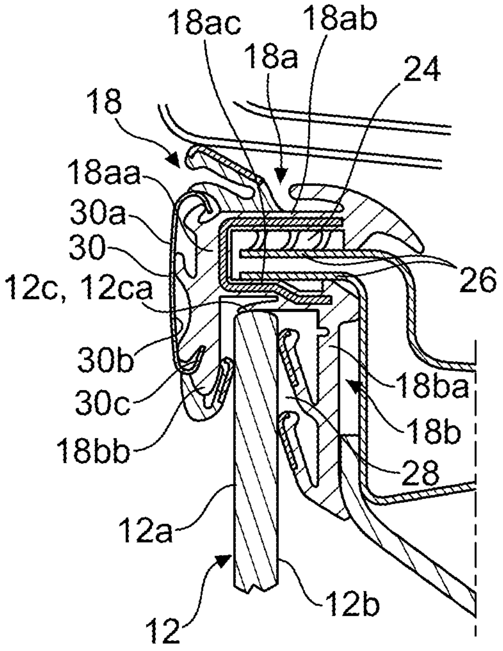
FIG. 4 is a cross sectional view along line A1-A1 of FIG. 3.
Figure 6:
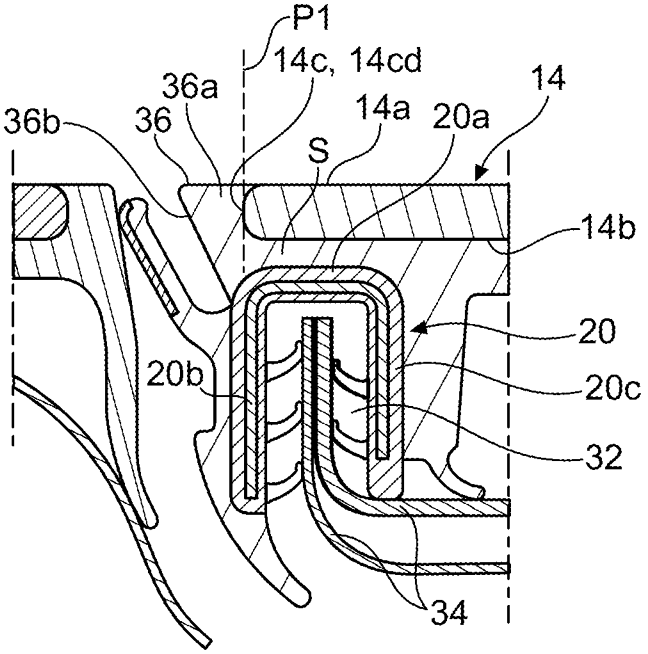
FIG. 6 is a cross sectional view along line C-C of FIG. 3.

Each pane 12, 14 has an exterior surface 12*a*, 14*a* intended to be located outside the motor vehicle, an interior surface 12*b*, 14*b* intended to be located inside the motor vehicle, and a peripheral edge 12*c*, 14*c* extending between said exterior and interior surfaces (see FIGS. 4 and 6).

Figure 5:
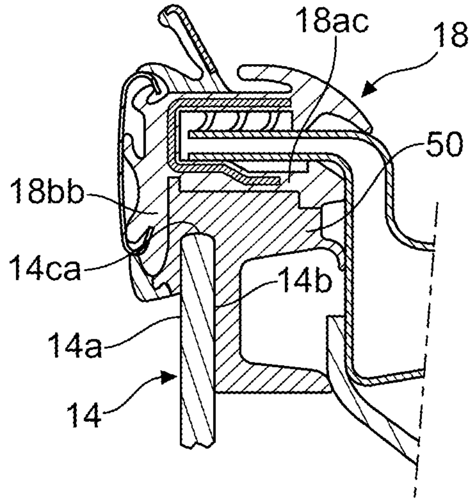
FIG. 5 is a cross sectional view along line A2-A2 of FIG. 3.

Each pane 12, 14 may be substantially flat. Thus, its surfaces 12*a*, 14*a*, 12*b*, 14*b* may be substantially flat. Of course, the pane 12, 14 and its surfaces may be slightly curved according to the expected design of the module. As shown in FIGS. 4 to 6, the peripheral edge 12*c*, 14*c* may have a cross sectional convex shape.

In the example shown, each pane 12, 14 has a polygonal shape and comprises four longitudinal edges. Each peripheral edge 12*c*, 14*c* includes therefore a top edge 12*ca*, 14*ca*, a front edge 12*cb*, 14*cb*, a bottom edge 12*cc*, 14*cc* and a rear edge 12*cd*, 14*cd* (see FIG. 3). The door may further comprise an appliqué 13, the movable window pane 12 being located between the stationary window pane 14 and the appliqué 13. The exterior surface 12*a* of the pane 12 is advantageously flush with the exterior surface 14*a* of the pane 14*a* and the exterior surface 13*a* of the appliqué 13.

Figure 7:
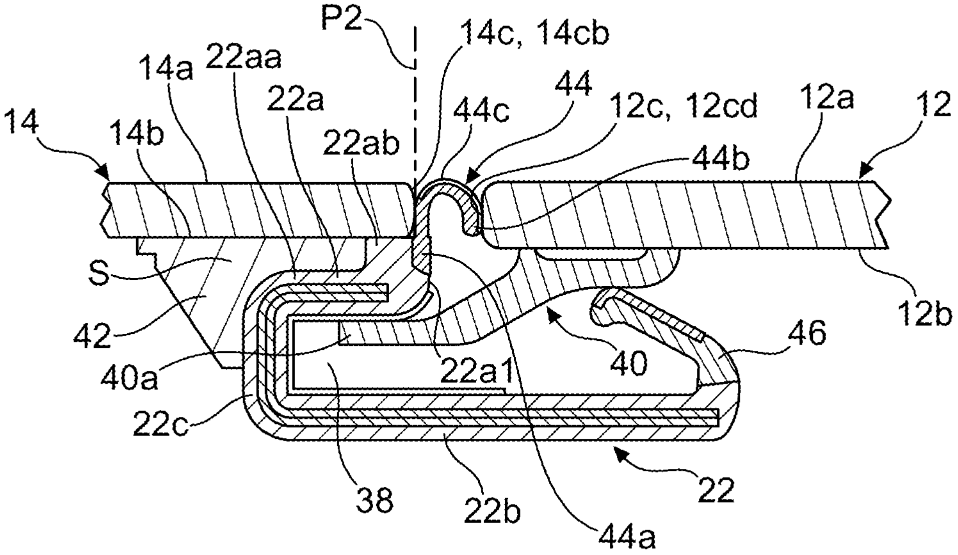
FIG. 7 is a cross sectional view along line B-B of FIG. 3.

FIG. 4 is a cross sectional view at the top edge 12*ca* of the movable window pane. FIG. 5 is a cross sectional view at the top edge 14*ca* of the fixed window pane. FIG. 6 is a cross sectional view at the rear edge 14*cd* of the fixed window pane. FIG. 7 is a cross sectional view at the front edge 14*cb* of the fixed window pane and at the rear edge 12*cd* of the movable window pane 12.

These figures show that the encapsulation 16 extends along the edges 14*ca*, 14*cb* and 14*cd* of the pane 14. Glass edge 14*ca* and the inboard side of the glass next to 14*cb* are encapsulated. Encapsulation of glass edges 14*cd* and 14*cc* is optional.

Thus, the encapsulation 16 extends along at least two edges of the pane 14 in the example shown but may not necessarily cover these edges as will be detailed below. The encapsulation 16 may comprise segments or profiles or division posts each extending along a portion of the longitudinal edges of the pane 14. Each profile of the division post has a length and a width, its length being greater than its width and extending along said portion of the longitudinal edges of the pane 14.

FIG. 4 shows a longitudinal profile which is called "third" profile 18. This third profile 18 extends along said edges 14*ca* and 12*ca*. The portion of the profile 18 shown in FIG. 4 is the one extending along the edge 12*ca* and is not over-molded.

A substantially vertical profile (not shown) is molded to profile 18 to be part of module 10, in order to guide the moveable glass edge 12*cb*.

The third profile 18 shown in FIG. 4 has first and second U-shaped portions 18*a*, 18*b* in cross section.

The first U-shaped portion 18*a* defines a longitudinal groove 24 that is oriented inwardly and is configured to receive a metallic flange 26 of the motor vehicle. In the example shown, the metallic flange includes two substantially horizontal panels that are superimposed and inserted into the groove 26. The first portion 18*a* includes an exterior wall 18*aa* connecting two lateral walls 18*ab*, 18*ac* defining the groove 26 therebetween.

The second U-shaped portion 18*b* defines a longitudinal groove 28 that is oriented downwardly in a plane parallel to the panes 12, 14 and which is configured to receive by sliding an upper portion of the movable window pane 12. The second portion 18*b* includes an interior wall 18*ba* and an exterior wall 18*bb* connected by a lateral wall which may be integrated in said lateral wall 18_ac_ as shown in the figure. The walls of the second portion 18_b_ define said groove 28.

Both portions 18_a_, 18_b_ include sealing lips intended to cooperate with the pane 12 and/or parts of the vehicle.

The third profile 18 further may include an elongated esthetic component 30 which extends along the profile 18 and is secured onto both portions 18_a_, 18_b_. The component 30 includes an esthetic exterior face 30_a_ and an interior face 30_b_. The component 30 includes a substantially flat portion including the faces 30_a_, 30_b_ and longitudinal hooks 30_c_ extending inwardly from the inner face 30_b_. The hooks 30_c_ are used to mechanically secure the component 30 onto the profile 18. The component 30 is intended to cover at least portions of said exterior walls 18_aa_, 18_bb_ which both comprise grooves intended to receive the hooks 30_c_ by snap fitting.

FIG. 5 still shows the third profile 18 and in particular its portion extending along the edge 14_ca_ and is over-molded.

This portion of the profile 18 differs from the portion of FIG. 2 in that it does not comprise the interior wall 18_ba_ and in that it is secured to the fixed window pane 12 by an over-molded material 50.

This over-molded material 50 extends onto the inner surface of the exterior wall 18_bb_, the downward surface of the lateral wall 18_ac_ and also over the edge 14_ca_ and portions of the surfaces 14_a_, 14_b_ of the fixed window pane 14. This over-molded material 50 may have lips or legs intended to abut against parts of the vehicle.

FIG. 6 shows a longitudinal profile which is called “second” profile 20. This second profile 20 extends along said edge 14_cd_ and is over-molded.

The second profile 20 shown in FIG. 6 is U-shaped in cross section and defines a longitudinal groove 32 that is oriented inwardly and is configured to receive a metallic flange 34 of the motor vehicle. In the example shown, the metallic flange 34 includes two substantially vertical panels that are superimposed and inserted into the groove 32.

The second profile 20 includes an exterior wall 20_a_ and two lateral walls 20_b_, 20_c_ connected by said exterior wall 20_a_. The exterior wall 20_a_ is usually parallel to the interior surface 14_b_ of the fixed window pane 14 and is secured thereto by an over-molded material 36. In the example shown, the exterior wall 20_a_ faces the interior surface 14_b_ and spaced therefrom. This space S is filled in with said over-molded material 36.

The lateral wall 20_b_ is substantially aligned with a portion (the rear edge 14_cd_ in the example shown) of said peripheral edge 14_c_ in a plane P1 that is perpendicular to the fixed window pane 14. The lateral wall 20_c_ extends perpendicularly to and faces the interior surface 14_b_.

In the example shown, the over-molded material 36 further extends over the lateral wall 20_c_ and the frond edge 14_cd_. The lateral wall 20_b_ is free of such over-molded material 36. Said over-molded material 36 is V-shaped (with an angle lower than) 90° in front of the rear edge 14_cd_ and defines a first planar surface 36_a_ aligned with the exterior surface 14_a_ and a second planar surface 36_b_ which extends between the first surface 36_a_ and the profile 20 and is inclined with respect to said plane P1.

The second profile 20 includes sealing or retention lips intended to cooperate with parts of the vehicle.

FIG. 7 shows another longitudinal profile which is called “first” profile 22, also known as division post. This first profile 22 extends substantially vertically along said edges 12_cd_, 14_cb_ and is over-molded.

The first profile 22 shown in FIG. 7 is U-shaped in cross section and defines a longitudinal groove 38 that is oriented forwardly and is configured to receive a guiding mean 40 secured to the movable window pane 12.

The first profile 22 includes an exterior wall 22_a_ and an interior wall 22_b_ connected together by a lateral wall 22_c_ and defining the groove therebetween. The exterior wall 22_a_ is parallel to the interior surface 14_b_ of the fixed window pane 14 and is secured thereto by an over-molded material 42. In the example shown, the exterior wall 22_a_ faces the interior surface 14_b_ and is L-shaped in cross section. The exterior wall 22_a_ includes first and second parts 22_aa_, 22_ab_ that are perpendicular to one another, said first part 22_aa_ being spaced from the interior surface 14_b_ and extending between said lateral wall 22_c_ and said second part 22_ab_. Said second part 22_ab_ is applied directly onto said interior surface 14_b_. Said first part 22_ab_ defines a space S with said interior surface 14_b_ that is filled in with the over-molded material 42.

The over-molded material 42 further extends over at least a portion of said lateral wall 22_c_. The over-molded material 42 does not cover the peripheral edge 14_cb_ along said first profile 22, i.e., the front edge 14_cb_, in the example shown.

The exterior wall 22_a_ has a longitudinal edge 22_a_1 which is opposite to the lateral wall 22_c_ that is substantially aligned with said front edge 14_cb_ in a plane P2 that is perpendicular to the fixed window pane 14.

This longitudinal edge 22_a_1 carries a first sealing lip 44 which is configured to abut against both edges 14_cb_ and 12_cd_. The sealing lip 44 is the sole member extending between said edges 14_cb_ and 12_cd_. The sealing lip 44 is curved (concave or convex) and defines a groove oriented inwardly. The lip 44 includes a longitudinal connecting edge 44_a_ which extends in the plane P2 and is secured to the longitudinal edge 22_a_1, and further includes an opposite longitudinal sealing edge 44_b_ abutting against the rear edge 12_cd_ of the pane 12. The longitudinal portion of the sealing lip 44 extending between both edges 44_a_, 44_b_ has an exterior surface 44_c_ which is substantially aligned with said exterior surfaces 14_a_, 12_a_.

As far as the interior wall 22_b_ of the first profile 22 is concerned, it crosses said plane P2 and is configured to face said guiding mean 40, and preferably also to face the interior surface 12_b_ of the movable window pane 12 as shown in the figure.

The interior wall 22_b_ carries a second sealing lip 46 which is configured to be in sealing contact with the guiding mean 40. In another example, only the first and the third sealing lips may be provided (no sealing is then provided on the guiding mean 40).

The guiding mean 40 may be formed of a single longitudinal part that is secured, for instance by gluing or over-molding, onto the interior surface 12_b_ of the pane 12 and includes a guiding leg 40_a_ crossing the plane P2 and received into the groove 38 for sliding motion. As shown in the drawings, the surfaces of the groove 38 may be coated with an antifriction layer suitable to cooperate by sliding with the guiding mean 40 and in particular its leg 40_a_. Therefore, as shown in the drawings, the walls 22_a_, 22_b_, 22_c_ may be coated with the antifriction layer inside the groove 38.

As shown in FIGS. 4 to 7, each profile 18, 20, 22 may comprise at least one U-shaped metallic rail embedded or encapsulated into a polymeric covering. The rail includes an interior branch and an exterior branch, connected together by a lateral branch. Each profile and its polymeric covering may be made by co-extrusion. The sealing lips may be made of an elastically deformable material, such as for example EPDM or thermoplastic. These lips may be obtained by over-molding during a process where the profiles 18, 20, 22 are connected together in their interconnection zones. Of course, each profile might not comprise metallic rail and might therefore comprise only polymeric materials. Each profile may have polypropylene in areas where material rigidity is needed and the lips might be made of a softer material. The profiles are secured onto the fixed window pane 14 by over-molding by means of the over-molded material 36, 42 and 50. Stationary glass edge 14*cc* is usually encapsulated as well.

Figure 8:
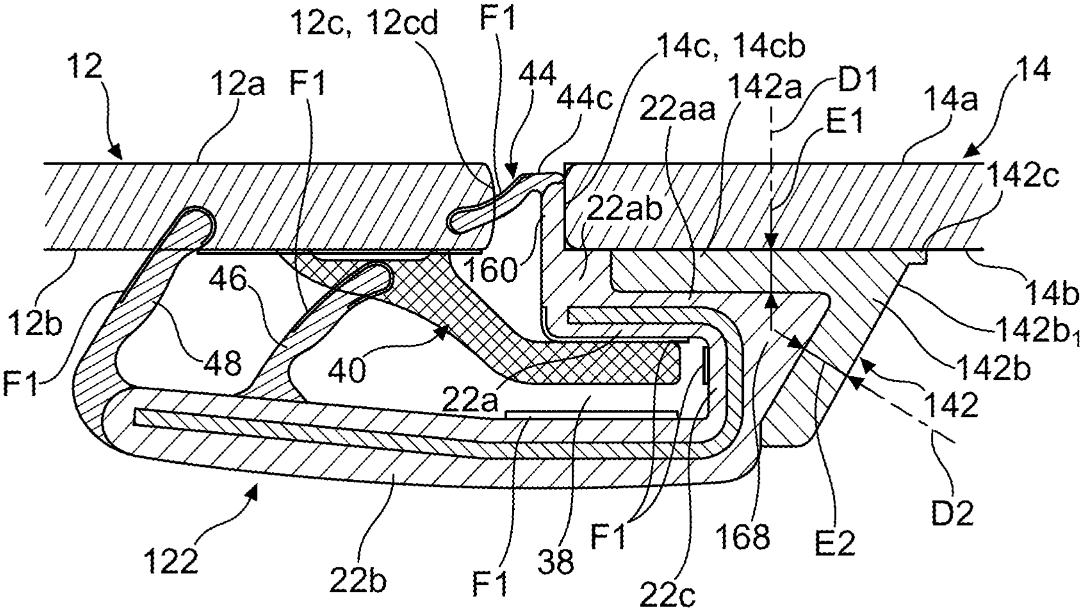
FIG. 8 is a cross sectional view similar to FIGS. 2 and 7 and showing an encapsulated fixed window module.

FIG. 8 is a view similar to the view of FIGS. 2 and 7.

The reference numerals used in relation to FIGS. 3 to 7 are used for designating the same elements in FIG. 8.

The window panes 12 and 14 are similar to the ones disclosed above. The guiding mean 40 is also similar.

The (first) profile 122 or division post of FIG. 8 extends along the edges 12*cd*, 14*cb* and is over-molded.

The profile 122 shown in FIG. 7 is U-shaped in cross section and defines a longitudinal groove 38 that is oriented forwardly and is configured to receive the guiding mean 40 secured to the movable window pane 12.

The profile 122 includes an exterior wall 22*a* and an interior wall 22*b* connected together by a lateral wall 22*c* and defining the groove 38 therebetween. The exterior wall 22*a* is parallel to the interior surface 14*b* of the fixed window pane 14 and is secured thereto by an over-molded material 142.

As shown in the drawings, the surfaces of the groove 38 may be coated with an antifriction layer F1 suitable to cooperate by sliding with the guiding mean 40 and in particular its leg 40*a*. Therefore, as shown in the drawings, the walls 22*a*, 22*b*, 22*c* may be coated with the antifriction layer F1 inside the groove 38.

The exterior wall 22*a* has a surface 22*a*1 that faces the interior surface 14*b* and is L-shaped in cross section. The exterior wall 22*a* includes first and second parts 22*aa*, 22*ab* that are perpendicular one another, said first part 22*aa* being spaced from the interior surface 14*b* and extending between said lateral wall 22*c* and said second part 22*ab*. Said second part 22*ab* is applied directly onto said interior surface 14*b* in the vicinity of the edge 14*c*, 14*cb*.

Said second part 22*ab* carries a protruding leg 160 which extends externally in a direction substantially perpendicular to the exterior wall 22*a*. The protruding leg 160 is interposed in the gap between both peripheral edges 12*cb*, 14*cb*, and is in abutment against the peripheral edge 14*cb*. The protruding leg 160 carries a first sealing lip 44 which is configured to abut against the edge 12*cb*. The first sealing lip 44 has an exterior surface 44*c* which is substantially aligned with the exterior surfaces 14*a*, 12*a*.

The protruding leg 160 is made of the same material as the main material (or polymeric covering) of the profile 122. The first sealing lip 44 is preferably made of a softer material.

The exterior wall 22*a*, and in particular its first part 22*aa*, defines a space S with the interior surface 14*b* that is filled in with the over-molded material 142 and in particular with a first portion 142*a* of this over-molded material 142.

The over-molded material 142 further extends over at least a portion of said lateral wall 22*c* and comprises a second portion 142*b* extending between the lateral wall 22*c* and the interior surface 14*b*. The over-molded material 142 does not cover the peripheral edge 14*cb* in the example shown.

As far as the interior wall 22*b* of the first profile 22 is concerned, it is longer than the exterior wall 22*a* and is configured to face said guiding mean 40, and preferably also to face the interior surface 12*b* of the movable window pane 12 as shown in the figure.

The interior wall 22*b* carries a second sealing lip 46 which is configured to be in sealing contact with the guiding mean 40, and a third sealing lip 48 which is configured to be in sealing contact with the interior surface 12*b* of the movable window pane 12.

Sealing lips 44, 46 and 48 may be coated with antifriction layers F1.

In another example, only the first and the third sealing lips may be provided (no sealing is then provided on the guiding mean 40).

The profile 122 may comprise at least one U-shaped metallic rail embedded or encapsulated into a polymeric covering. This rail may include a first branch extending into the exterior wall 22*b*, a second branch extending into the interior wall 22*a*, and a connecting branch extending into the lateral wall 22*c*.

The profile 122 and its polymeric covering may be made by co-extrusion. The sealing lips may be made of an elastically deformable material, such as for example EPDM or thermoplastic. These lips may be realized by over-molding or co-extrusion. Of course, the profile 122 might not comprise metallic rail and might therefore comprise only a polymeric material. The polymeric or covering material of the profile 122 may be a thermoplastic or an elastomer thermoplastic, such as for instance polypropylene. The over-molded material is for instance made of thermoplastic, elastomer thermoplastic, EPDM, SEBS, etc.

As shown in FIG. 8, the first portion 142*a* of the over-molded material 142 has a first thickness E1 which is constant along a major portion of this first portion. The thickness E1 of this first portion 142A is measured in a direction which is perpendicular to the interior surface 14B of the fixed window pane 14 and which is also perpendicular to the exterior wall 22*a*.

The second portion 142*b* of the over-molded material 142 has a second thickness E2 which is constant along a major portion of the second portion. The thickness E2 of this second portion 142*b* is measured in a direction which is perpendicular to the lateral wall 22*c*.

This second portion 142*b* has an outer face 142*b*1 which extends between the lateral wall 22*c* and the interior surface 14*b* and which includes a major portion which is inclined with respect to the interior surface 14*b*.

Figure 9A:
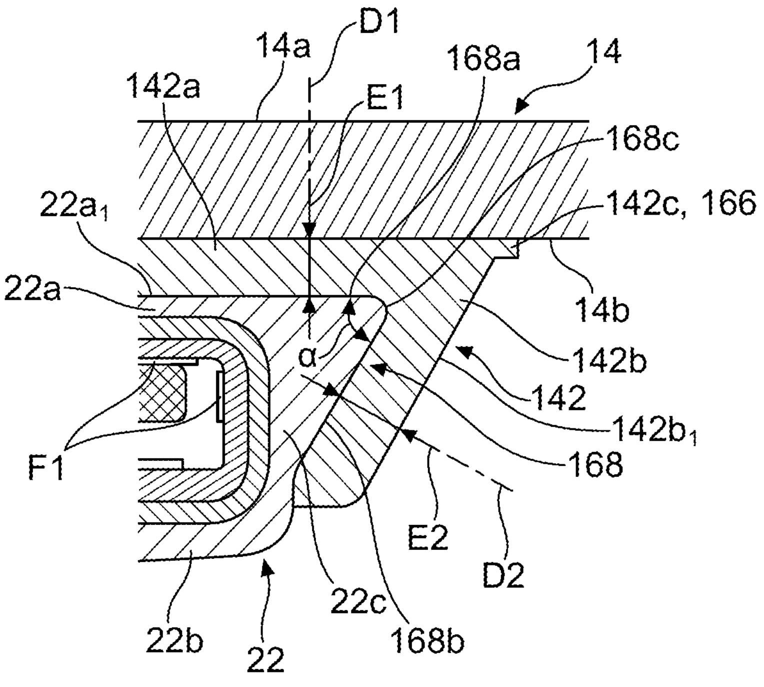
FIG. 9*a* is an enlarged view of a detail of FIG. 8.
Figure 9B:
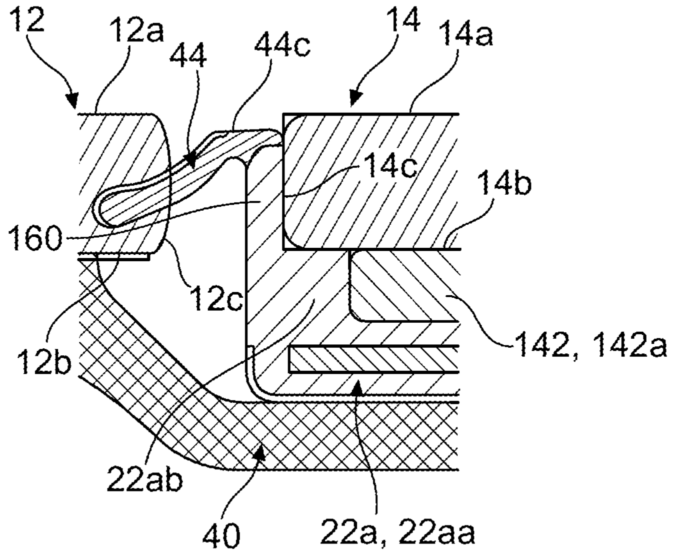
FIG. 9*b* is an enlarged view of another detail of FIG. 8.

In the shown example, the over-molded material 142 is V-shaped and includes both portions 142*a*, 142*b* connected therebetween and forming together a tip 142*c*. The over-molded material 142 includes a protruding rib 166 on its tip 142*c*, this protruding rib 166 extending on the interior surface 14*b* (FIG. 9*a*).

In the example shown, the shape of the over-molded material is provided by the shape of the profile 122 which includes a tooth 168 or a fin (such as a shark fin) on its lateral wall 22*c*.

The tooth 168 includes a first surface 168*a* parallel to the interior surface 14*b* and aligned with the surface 22*a*1 of the exterior wall 22*a*, and a second surface 168*b* which is inclined with respect to the interior surface 14*b*. The function of tooth 168 is to create a constant offset between the second surface 168*b* and the outer face 142*b*1. The shape and location of the surface 168*b* will thus evolve according to the shape and location of the outer face 142*b*1. The thickness E2 of the second portion 142*b* may be measured in a direction which is perpendicular to this second surface 168*b*.

The tooth 168 is preferably fully embedded into the over-molded material so that the first portion 142*a* extends between the first surface 168*a* and the interior surface 14*b* and the second portion 142*b* extends between the second surface 168*b* and the interior surface 14*b*. The first surface 168*a* is planar and the second surface 168*b* is also planar in the example shown. This second surface 168*b* is preferably parallel to the outer face 142*b*1 to ensure that E2 is constant. The first and second surfaces 168*a*, 168*b* are therefore V-shaped in cross section in the example shown. The first and second surfaces 168*a*, 168*b* form an angle □ or form a tip having an angle which is comprised between 2° and 85°, and preferably between 5° and 70°. In other words, the tooth 168 defines an angle □ comprised between 2° and 85°, and preferably between 5° and 70°.

The invention relates to an encapsulated fixed window module which is similar to the encapsulated window module described above in relation with FIGS. 3 to 9*b*. The above description made in reference to those figures applies therefore to the claimed invention and the description of following figures.

According to the invention, the over-molded material 142 is in contact with at least one protruding lip 162 (only described later on FIG. 10*a*) which is located between said exterior wall 22*a* and said interior surface 14*b*. Said at least one protruding lip 162 is elastically deformable from a first unconstrained position to a second constrained position in which said at least one protruding lip 162 is elastically deformed. Said at least one protruding lip 162 is compressed between said exterior wall 22*a* and said interior surface 14*b* so as to adopt said second position.

FIGS. 10*a* to 10*g* show embodiments of the invention.

Figure 10A:
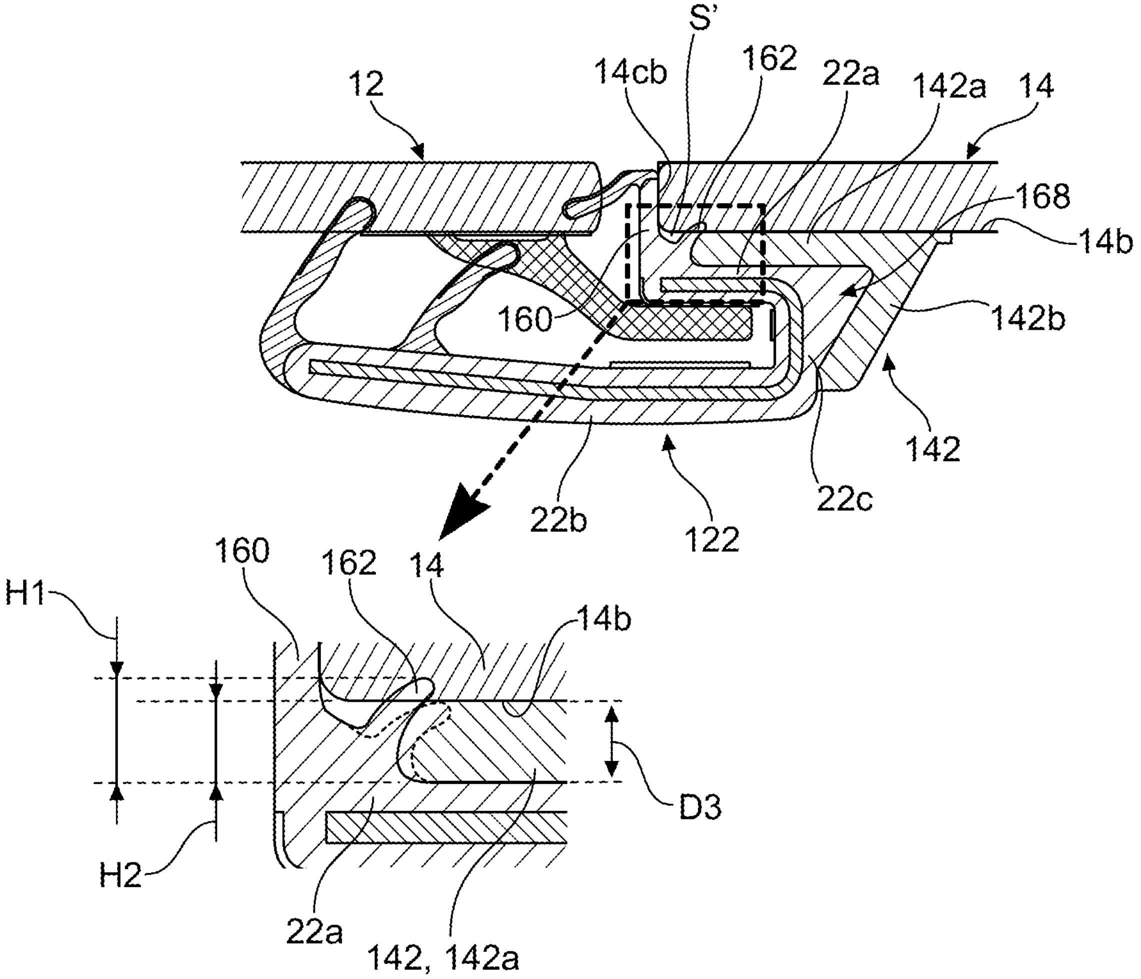
FIGS. 10*a* to 10*i* are views corresponding to the view of FIG. 8 and showing embodiments of the invention.

The embodiment of FIG. 10*a* differs from the embodiment of FIG. 8 in that the second part 22*ab* of the exterior wall 22*a* is replaced by one protruding lip 162 which extends externally and which is in abutment against the interior surface 14*b* of the window pane 14.

In the enlarged detailed view of FIG. 10*a*, the protruding lip 162 is shown in its first position in continuous line and in its second position in dashed line. The protruding lip 162 is shown in its first position in all the figures showing the invention.

The exterior wall 22*a* is located at a first distance D3 from the interior surface 14*b*, said first distance being measured in a direction which is perpendicular to said interior surface 14*b*. The protruding lip 162 has a first height H1 in said first position and a second height H2 in second position, said first and second heights being measured in a direction which is perpendicular to said interior surface. The second height H2 is equal to the first distance D3, and the first height H1 is greater than the second height H2 and the first distance D3.

The protruding lip 162 and the protruding leg 160 may be made of the same material as the main material of the profile 122. The first sealing lip 44 is made of a softer material.

The over-molded material 142 does not cover the peripheral edge 14*cb*. This is due to the presence of the protruding lip 162 which abuts against the pane 14 and avoid over-molded material 142 passing through the lip 162 and up to the edge 14*cb*.

As shown in the drawings, the protruding lip 162 and leg 160 may define together and with the pane 14 a space S' that is empty, i.e., that is not filled with over-molded material 142.

Figure 10B:
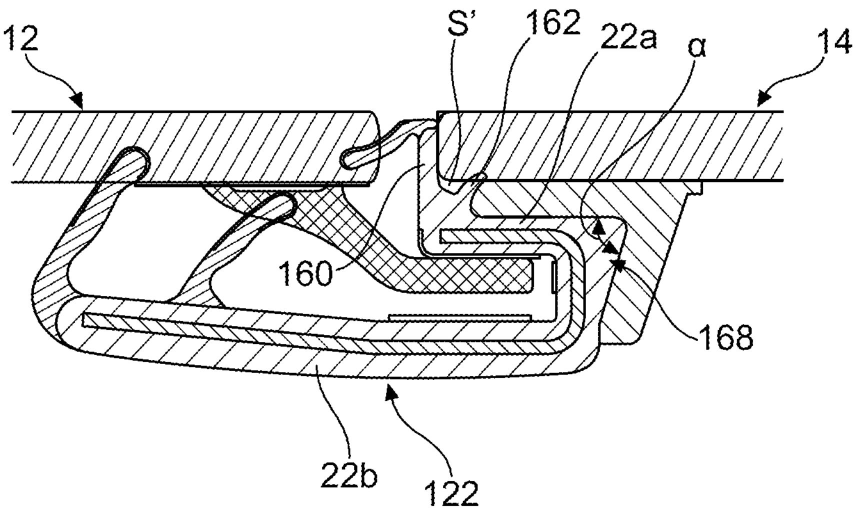

The embodiment of FIG. 10*b* differs from the embodiment of FIG. 8 in that the tooth 168 defines a larger angle □□ of about 70-85°. The V-shape of the over-molded material 142 has a similar angle.

Figure 10C:
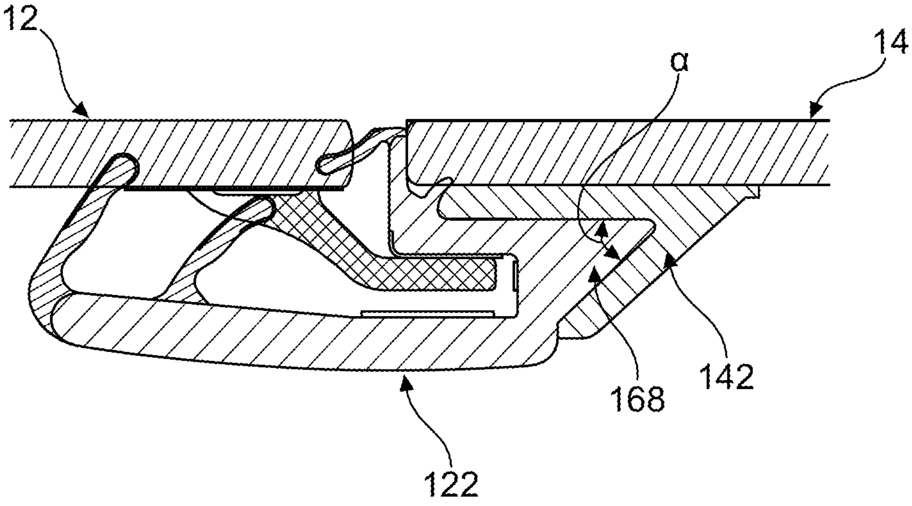

The embodiment of FIG. 10*c* differs from the embodiment of FIG. 8 in that the tooth 168 defines a small angle □ of about 20-40°. The V-shape of the over-molded material 142 has a similar angle.

Figure 10D:
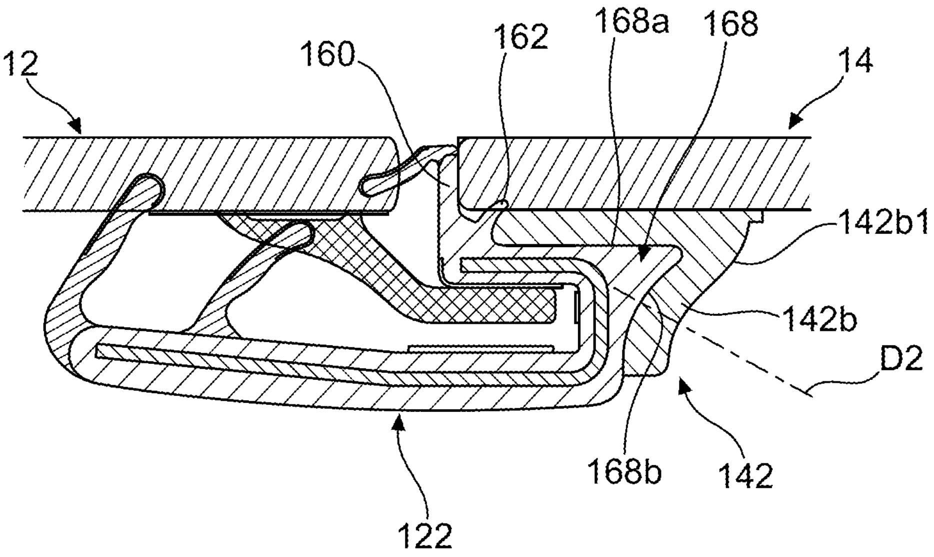

The embodiment of FIG. 10*d* differs from the embodiment of FIG. 8 in that the second surface 168*b* of the tooth 168 is curved and in particular is concave. The second portion 142*b* of the over-molded material 142 conforms to the shape of this second surface 168*b* and has a curved shape. Similarly, the outer face 142*b*1 of the over-molded material 142 is curved and concave to get a thickness E2 as constant as possible.

Figure 10E:
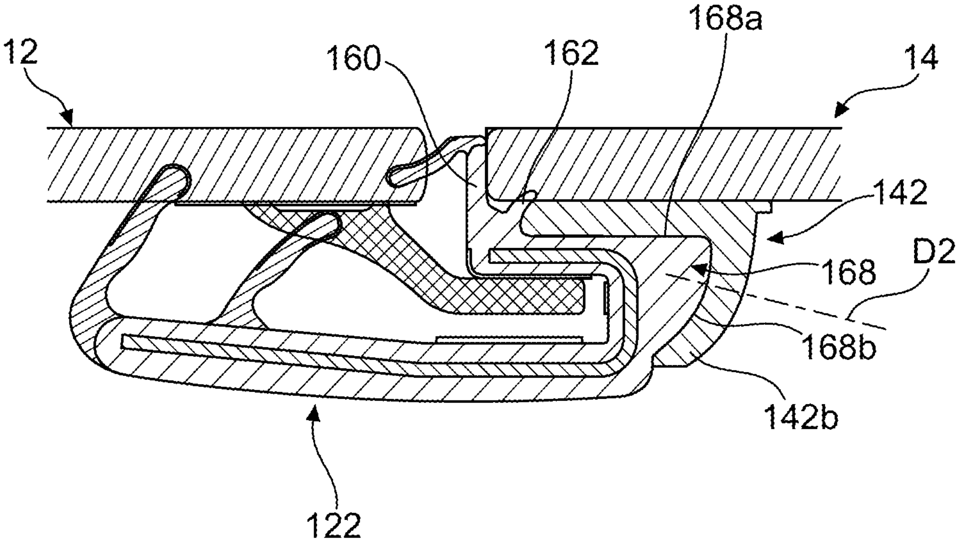

The embodiment of FIG. 10*e* differs from the embodiment of FIG. 8 in that the second surface 168*b* of the tooth 168 is curved an in particular convex. The second portion 142*b* of the over-molded material 142 conforms to the shape of this second surface 168*b* and has a curved shape. Similarly, the outer face 142*b*1 of the over-molded material 142 is curved and convex to get a thickness E2 as constant as possible.

Figure 10F:
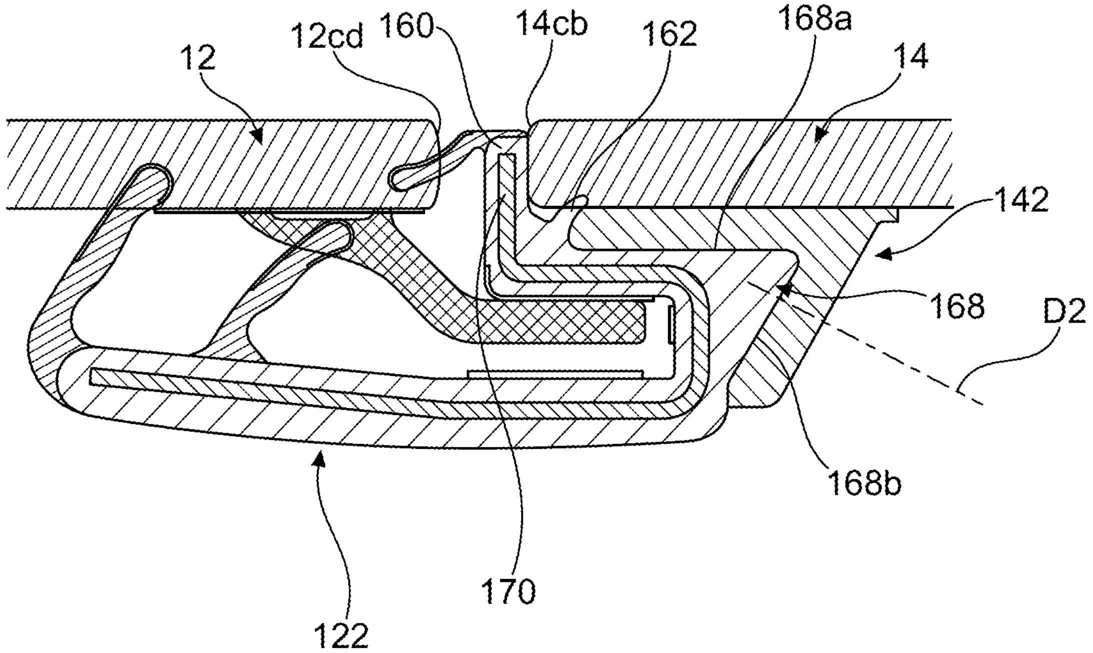

The embodiment of FIG. 10*f* differs from the embodiment of FIG. 8 in that the metallic rail embedded or encapsulated into the polymeric covering includes a leg 170 at its edge opposite the connecting branch. This leg 170 extends outwardly and is interposed between the edges 12*cd* and 14*cb*.

Figure 10G:
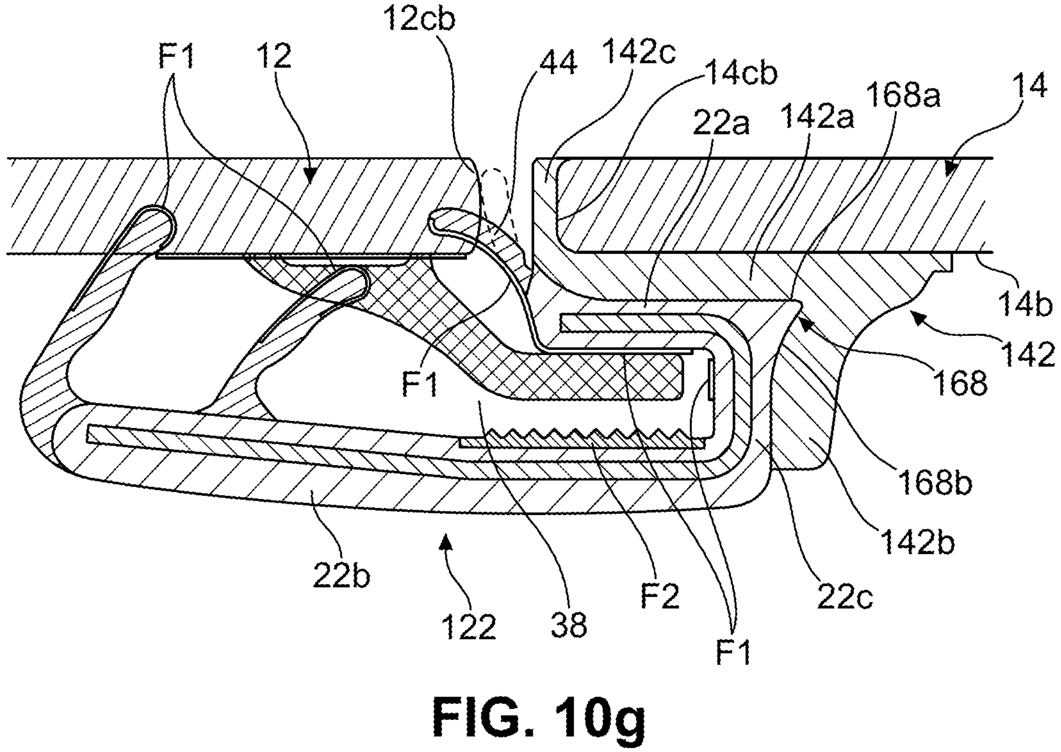

The embodiment of FIG. 10*g* differs from the embodiment of FIG. 8 in that over-molded material 142 comprises a third portion 142*c*, the first portion 142*a* extending between the third and second portions 142*c*, 142*b*.

The third portion 142*c* extends on the peripheral edge 14*cb* of the fixed pane 14. The third portion 142*c* is perpendicular to the first portion 142*a* and extends outwardly from the end of the first portion 142*a* which is opposite to the second portion 142*b*. The third portion 142*c* covers entirely the peripheral edge 14*cb* in the example shown.

Therefore, the profile 122 is not directly in contact with the pane 14. Its exterior wall 22*b* is remote from the interior surface 14*b* and is separated therefrom by the over-molded material 142.

The first sealing lip 44 of the profile 122 is configured to abut against edge 12*cd*. The third portion 142*c* and the sealing lip 44 are both located between the edges 14*cb* and 12*cd*.

As shown, the third portion 142*c* may include an end which is coplanar with said exterior surfaces of said panes 12, 14.

Figure 10H:
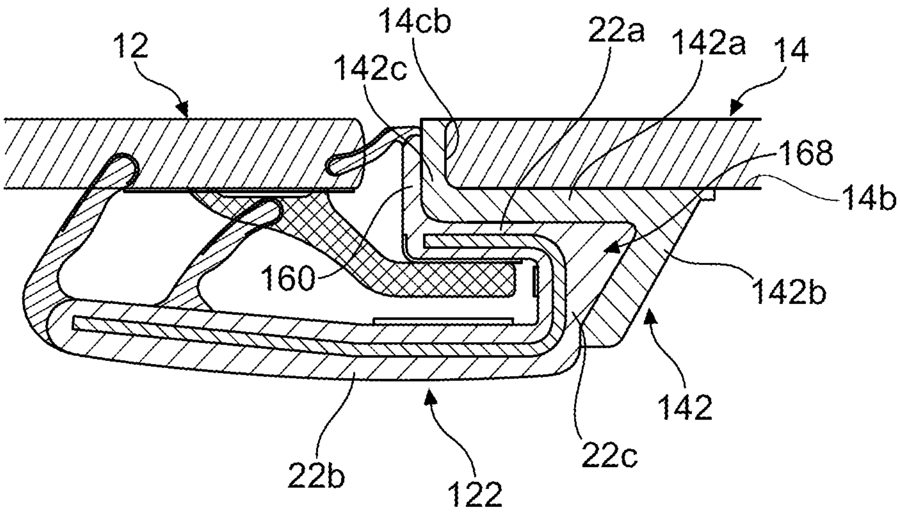

The embodiment of FIGS. 10*g* and 10*h* show that there is a risk of bleed of the over-molded material up to the peripheral edge 14*cb* of the window pane 1 when no protruding lip according to the invention is located between the division post 122 and the window pane 14.

The embodiment of FIG. 10*g* further differs in that the antifriction layer on the exterior surface of the interior wall 22*a* of the profile 122 is replaced by a co-extruded thermoplastic material and/or a cellular or foam material F2. This material is used to prevent rattle noise/tapping noise during door slam. The material F2 has for instance a shore A hardness of about 25-60 and/or a coefficient of friction less than about 0.6. All the embodiments described above may have such material in the groove 38 instead of one of the antifriction layers F1.

In another embodiment shown in FIG. 10*h*, the third portion 142*c* of FIG. 10*g* may be combined with the leg 160 of any of the preceding embodiments (FIG. 8 to FIG. 10*g*) and may therefore be interposed between the peripheral edge 14*cb* of the pane 14 and this leg 160.

Figure 10I:
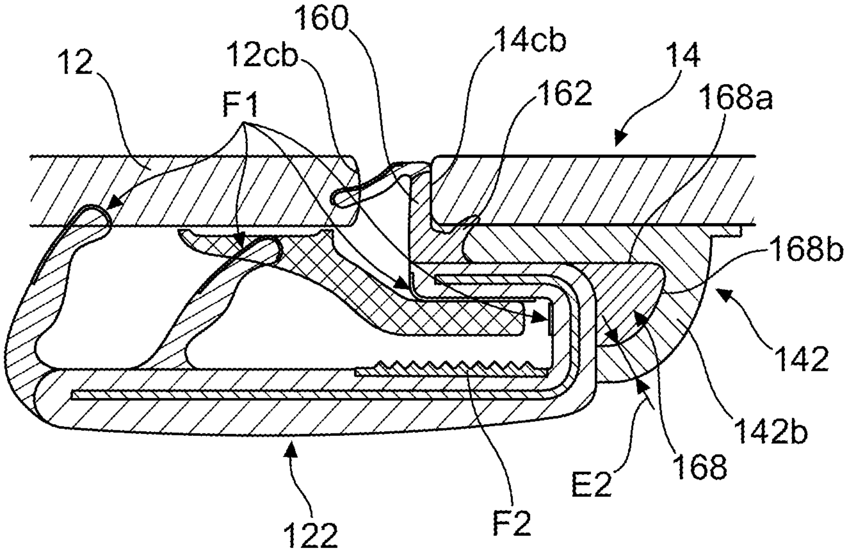

In another embodiment of the invention shown in FIG. 10*i*, the tooth 168 is made of a material which is different from the main (co-extruded or covering) material of the profile 122. For instance, the main material of the profile 122 is harder than the material of the tooth 168. The main material is for instance a PP. The material of the tooth 168 may have a Shore A hardness of between 70-95, and for instance of about 85. The material of the tooth 168 is for instance a TPE.

The protruding leg 160 and the protruding lip 162 may also be made of a material which is different from the main material of the profile 122. The materials of the leg 160, of the lip 162 and of the tooth 168 may be the same.

Even if the tooth 168 and/or the protruding leg 160 and/or the protruding lip 162 may be made of different material, they are preferably made by co-extrusion with the profile 122. Use of a softer material for the protruding leg 160 for instance enhances the molding operation.

The second portion 142*b* extends on the tooth 168 and has an end linked to the profile 122. This portion 142*b* has a constant thickness E2 up to this end.

In the embodiment of FIG. 10*i*, both branches of the metallic rail of the profile 122 are straight while in the embodiments of FIGS. 10*a*-10*h* the exterior branch of the metallic rail is slightly inclined and has an end opposite its lateral branch which protrudes inwardly.

FIGS. 11 to 18 show further embodiments of the invention.

Figure 11:
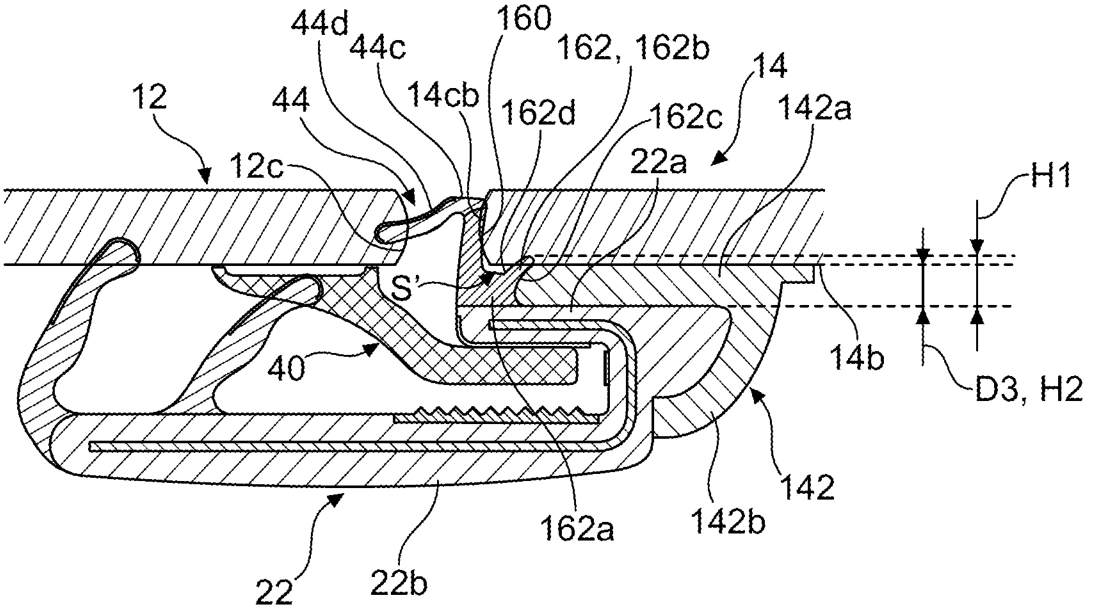
FIGS. 11 to 18 are views corresponding to the view of FIG. 8 and showing further embodiments of the invention.

The embodiment of FIG. 11 differs from the one of FIG. 10*d* mainly in that the protruding lip 162 and the protruding leg 160 are made of a first material which is different from a second material of the division post 22*b*, both first and second materials being co-extruded before securing the division post to the window pane by over-molding.

Figure 12:
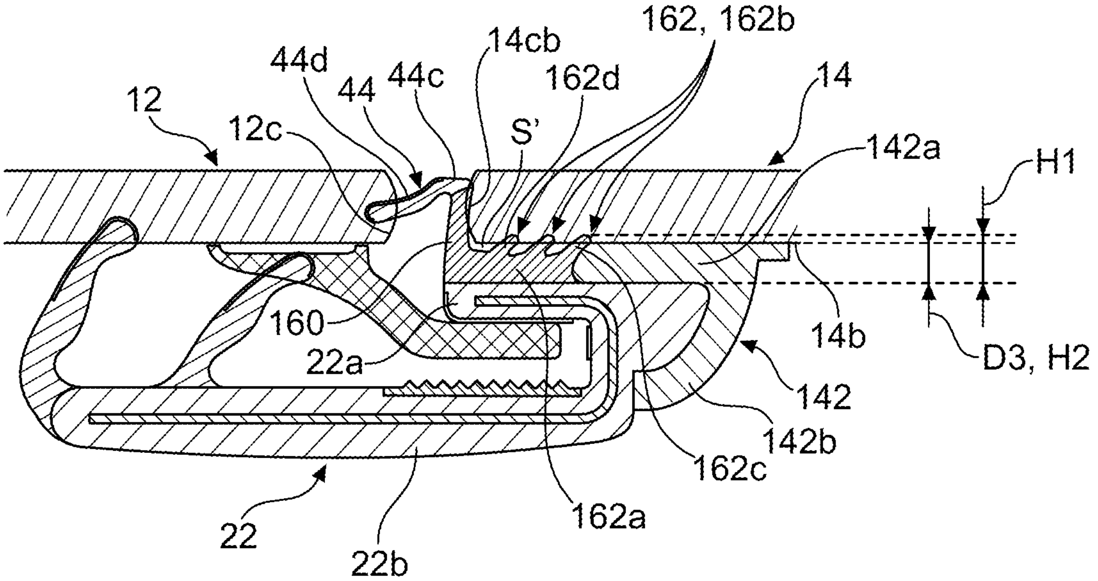
Figure 13:
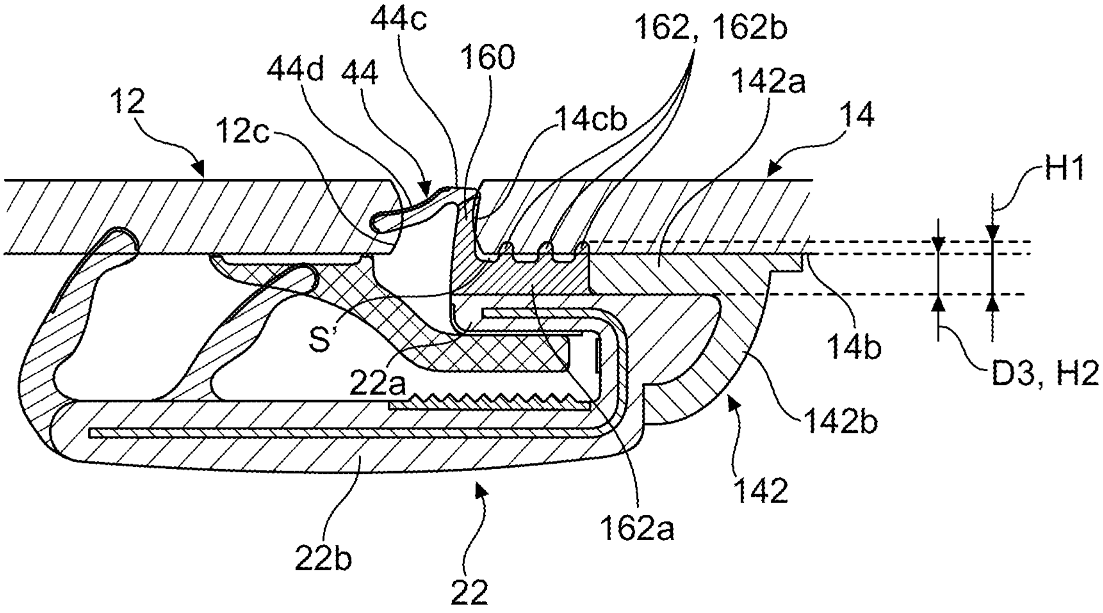

There are three protruding lips 162 between the exterior wall 22*a* and the interior surface 14*b* in the embodiment of FIGS. 12 and 13.

In all the figures showing the invention, the protruding lip(s) may be considered as comprising a securing base 162*a* and at least one flexible lip 162*b* extending from said securing base 162*a*.

Figure 14:
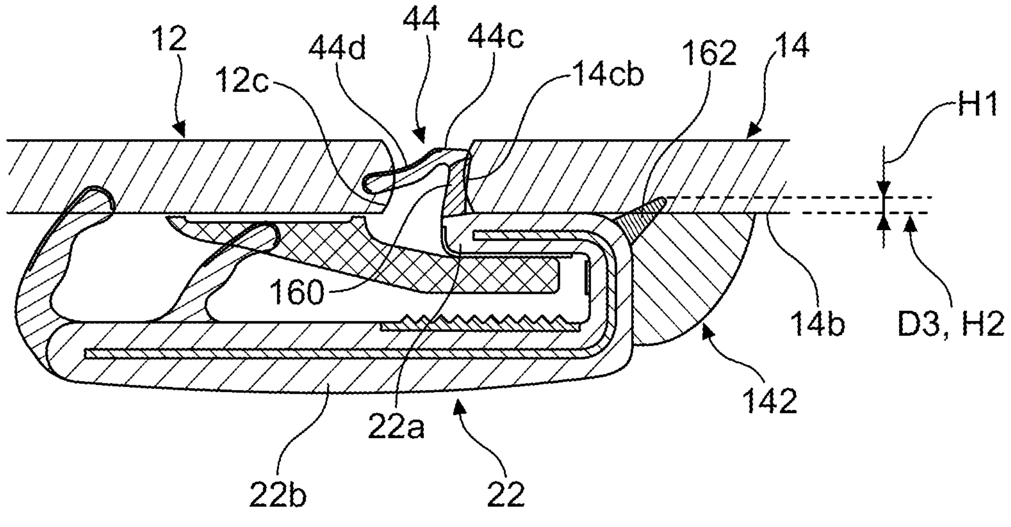

In the embodiments of FIG. 11 and the former embodiments showing the invention, the protruding lip 162 includes a single securing base 162*a* and a single flexible lip 162*b*. In the embodiments of FIGS. 12 and 14, the protruding lip 162 includes a single securing base 162*a* and three flexible lips 162*b*.

The securing base 162*a* is secured to the division post 22 and in particular to its exterior wall 22*b* (an more specifically the exterior face of the exterior wall facing the interior face 14*b*). The flexible lip(s) 162*b* extends outwardly from the securing base 162*a*. The flexible lips 162*b* are adjacent one another. The space between two adjacent lips 162*b* may be empty or filled with over-molded material. The flexible lips 162*b* may be identical or different from one another. Each of said adjacent protruding lips are elastically-deformable;

In the embodiments of FIGS. 11 and 12 and the former embodiments showing the invention, the protruding lip 162 has a cross sectional curved shape and comprises a concave side 162*c* which is oriented towards the lateral wall 22*c* and an opposite convex side 162*d*. The empty space S' may be defined between said opposite convex side 162*d* and said interior surface 14*b*, closed to the peripheral edge 14*cb*.

In the embodiments of FIG. 13, the protruding lip 162 has a cross sectional straight shape and extends perpendicularly to the interior surface 14*b*.

In the former embodiments showing the invention, the protruding lip 16 is located at a first end of the exterior wall 22*a* which is opposite to the lateral wall 22*c*. To the contrary, in the embodiment of FIG. 14, the protruding lip 162 is located at the opposite second end of the exterior wall 22*a*.

In this embodiment of FIG. 14, the protruding lip 162 can be made of the same and main material of the division post 22. In the example shown, the main material of the division post 22 is PP and the protruding lip 162 is made of a more flexible material such as an elastomer.

The distance D3 between the exterior wall 22*a* and the interior surface 14*b* is here null. Height H1 is greater than H2 which is close to zero in this embodiment.

In the former embodiments showing the invention, the protruding lip 16 is carried by said exterior wall 22*a*.

In the embodiments of FIGS. 15 to 18, the protruding lip(s) is/are carried by said fixed window pane 14 and in particular connected to the interior surface 14*b*.

As described above, the protruding lip(s) 162 may be considered as comprising a securing base 162*a* and at least one flexible lip 162*b* extending from said securing base 162*a*.

Figure 15:
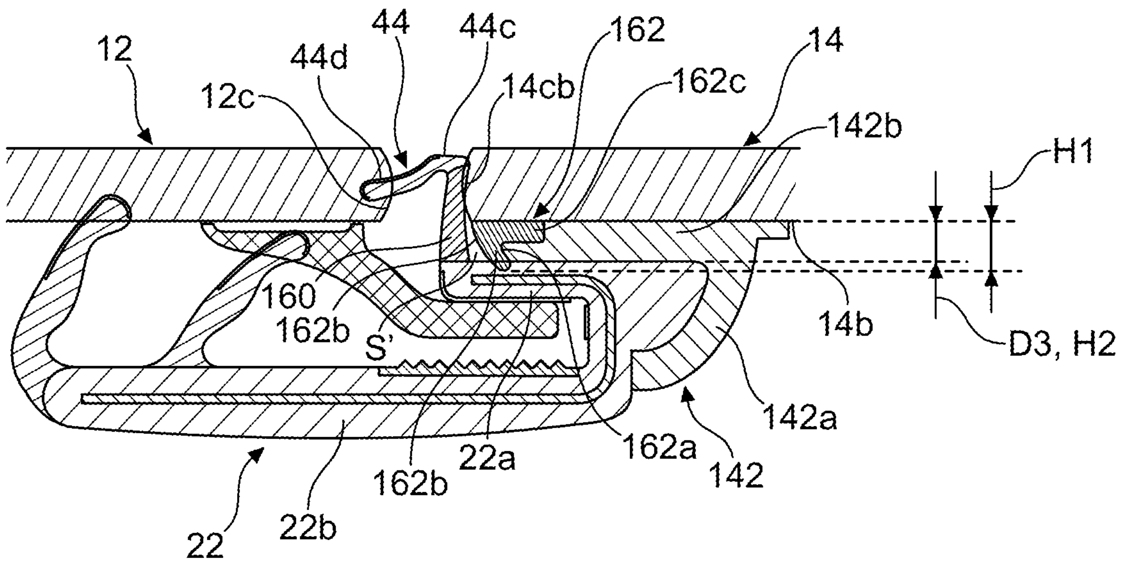
Figure 16:
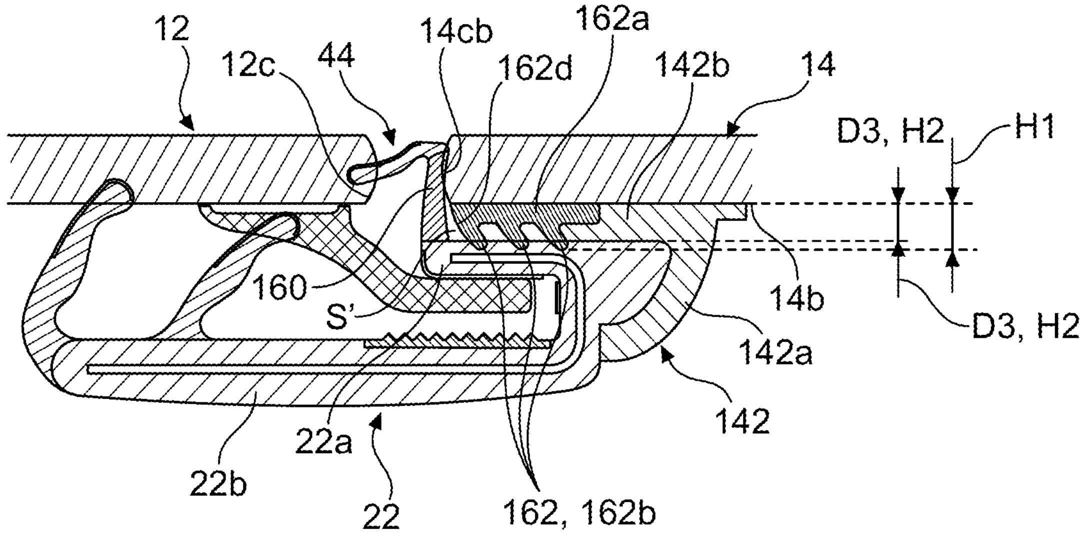

In the embodiments of FIG. 15, the protruding lip 162 over-molded on the fixed glass 14, includes a single securing base 162*a* and a single flexible lip 162*b*. In the embodiment of FIG. 16, the protruding lip 162 includes a single securing base 162*a* and three flexible lips 162*b*.

The securing base 162*a* is secured to the interior surface 14*b* and the flexible lip(s) 162*b* extend inwardly from the securing base 162*a*. The flexible lips 162*b* are adjacent one another. The space between two adjacent lips 162*b* may be empty or filled with over-molded material. The flexible lips 162*b* may be identical or different from one another. Each of said adjacent protruding lips are elastically-deformable.

The protruding lips 162 of FIGS. 15-18 have a cross sectional curved shape and comprises a concave side 162*c* which is oriented towards the lateral wall 22*c* and an opposite convex side 162*d*. The empty space S' may be defined between said opposite convex side 162*d* and said exterior wall 22*a*, closed to the peripheral edge 14*cb*.

As shown, the convex side 162*d* may be aligned and flush with a convex surface of said peripheral edge 14*cb*. In variant, said convex side is remote from said convex surface of said peripheral edge.

In the embodiments of FIGS. 11 to 13 and in the other embodiments showing the invention, the protruding lip(s) is/are integral with the protruding leg 160. The protruding leg 160 is perpendicular to the exterior wall 22*a* and is in abutment against the peripheral edge 14*cb*.

In the embodiments of FIGS. 14 to 18, the protruding lip(s) is/are independent from the protruding leg 160. The protruding leg 160 is also perpendicular to the exterior wall 22*a* and is in abutment against the peripheral edge 14*cb*.

In all these embodiments, the protruding leg 160 carries a sealing lip 44 which is configured to abut against the peripheral edge 12*c* of the movable window pane 12. This first sealing lip 44 has a concave surface 44*d* which is oriented outwardly and opposite to the division post 22.

Figure 17:
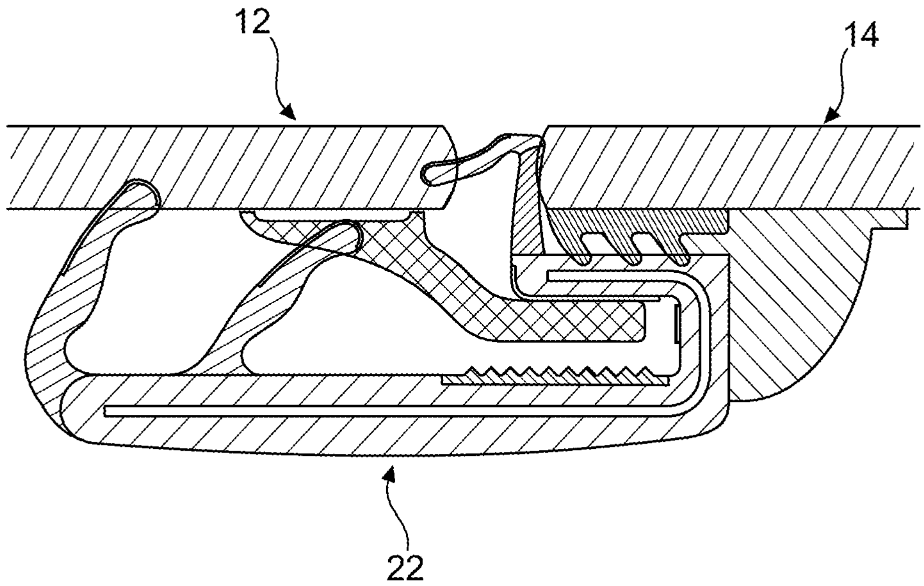

The embodiment of FIG. 17 differs from the one of FIG. 16 in that it does not include the tooth 168.

Figure 18:
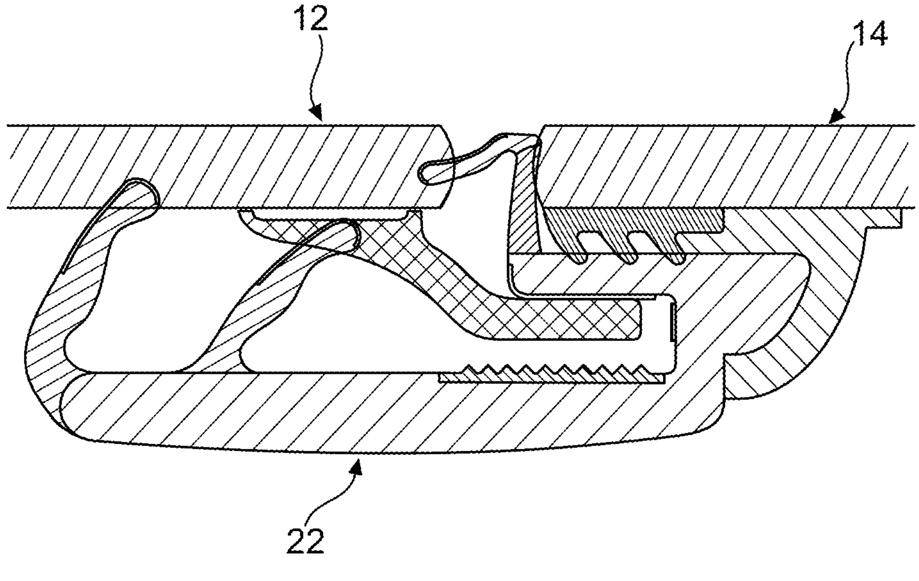

The embodiment of FIG. 18 differs from the one of FIG. 16 in that it does not include a metallic rail in the division post which is only made of polymeric material.

Figure 19:
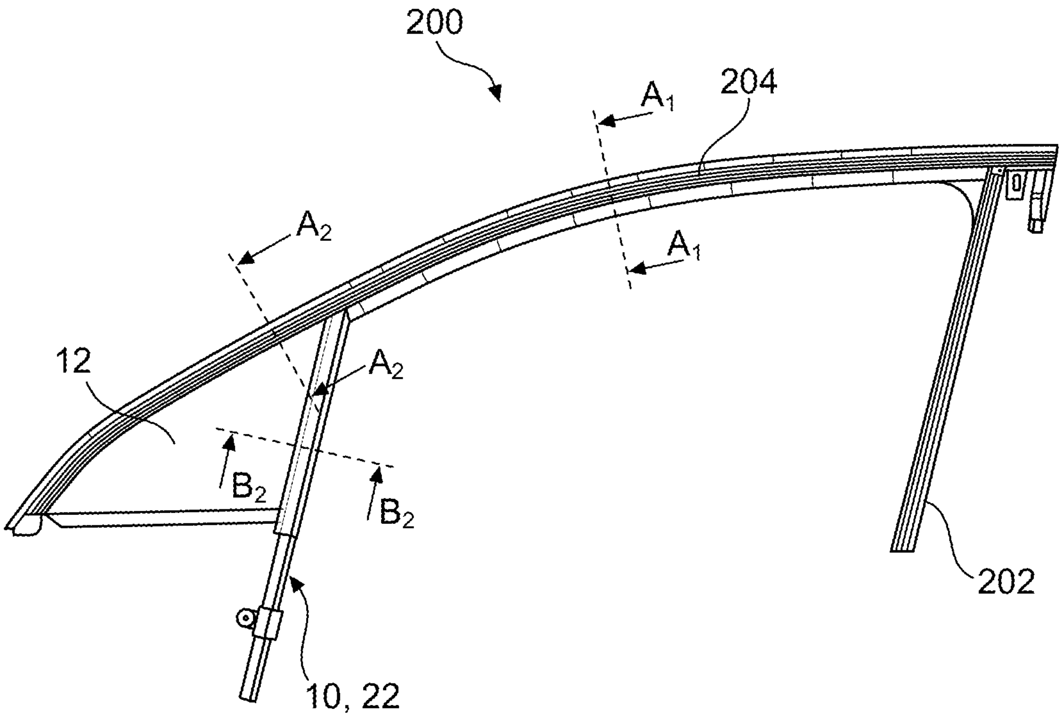
FIG. 19 is a fragmentary side view of an encapsulated fixed front window module.
Figure 21:
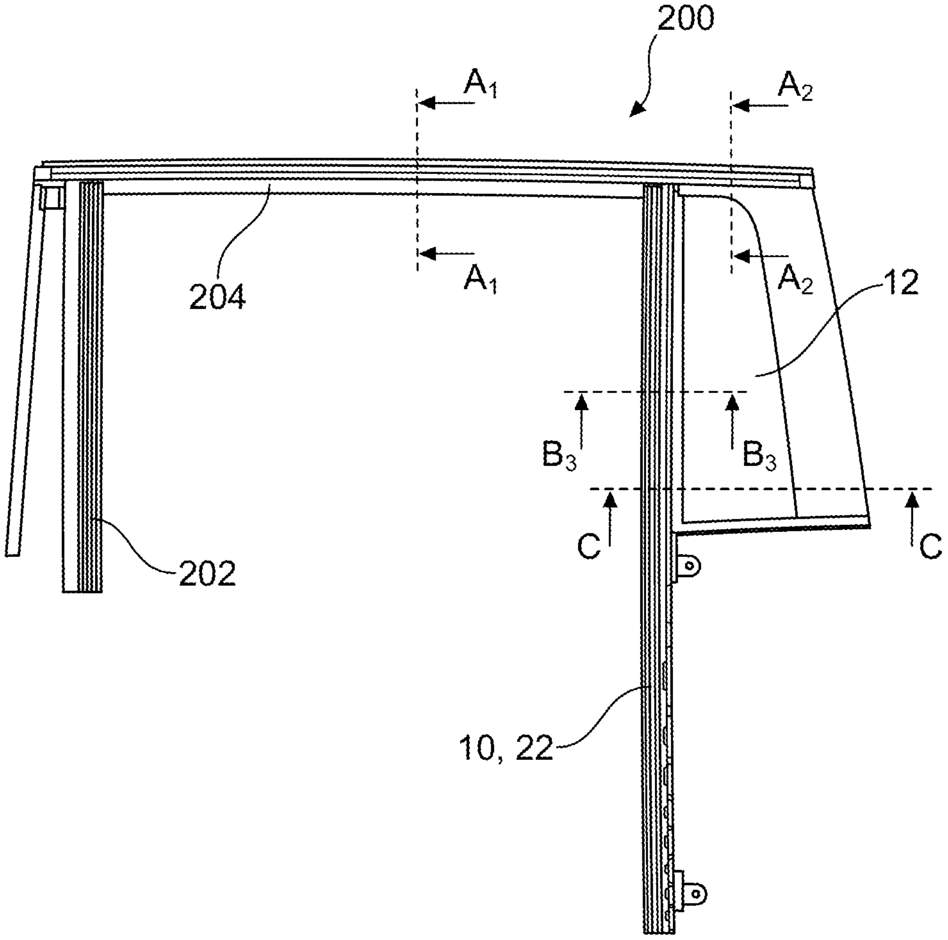
FIG. 21 is a fragmentary side view of an encapsulated fixed rear window module.

FIGS. 19 and 21 show two examples of glass run 200 for a motor vehicle. The glass run 200 includes an encapsulated fixed window module 10 according to the invention and further comprises first and second extruded segments 202, 204.

The first extruded segment 202 is parallel to the division post 22. The second extruded segment 204 extends between the encapsulated fixed window module 10 and the first extruded segment 202 and has a first end 204*a* connected by overmolding to an upper end of the division post 202 and a second end connected by overmolding to an upper end of said first extruded segment 202. The second extruded segment 204 is similar to the third profile 18 as described above.

Figure 20:
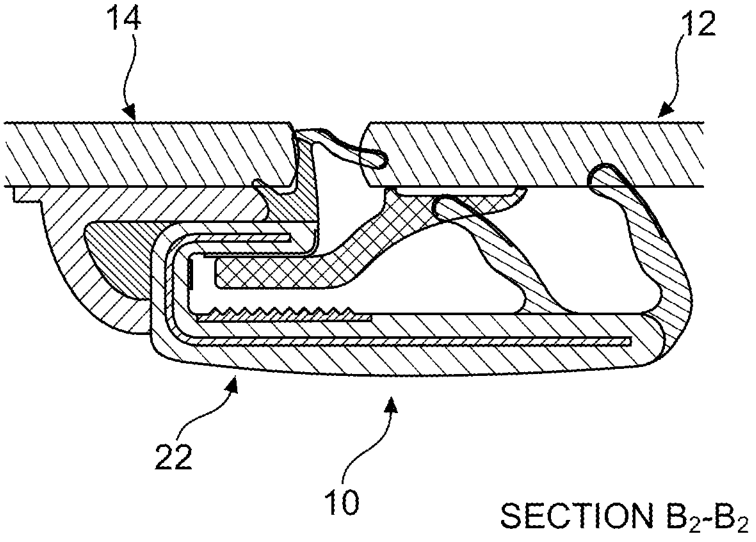
FIG. 20 is a cross sectional view along line B2-B2 of FIG. 19.
Figure 22:
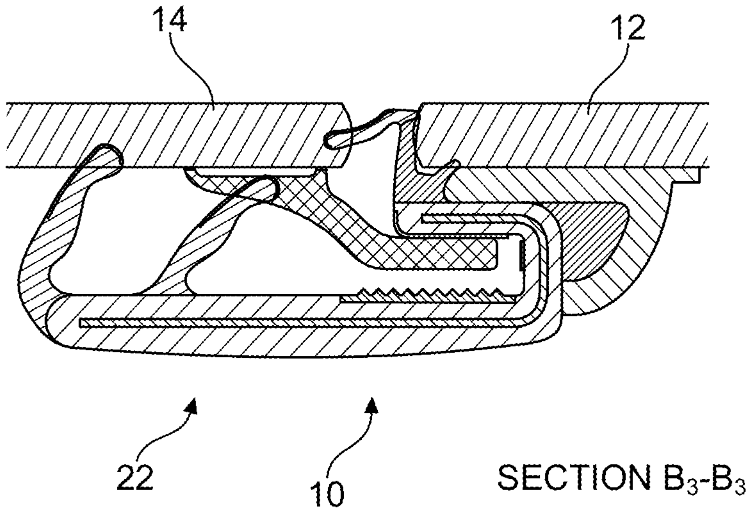
FIG. 22 is a cross sectional view along line B3-B3 of FIG. 21.

FIG. 20 is a cross sectional view along line B2-B2 of FIG. 21 and FIG. 22 is a cross sectional view along line B3-B3 of FIG. 21. A cross sectional view along line A1-A1 of FIGS. 19 and 21 would be similar to the view of FIG. 4.

Figure 23:
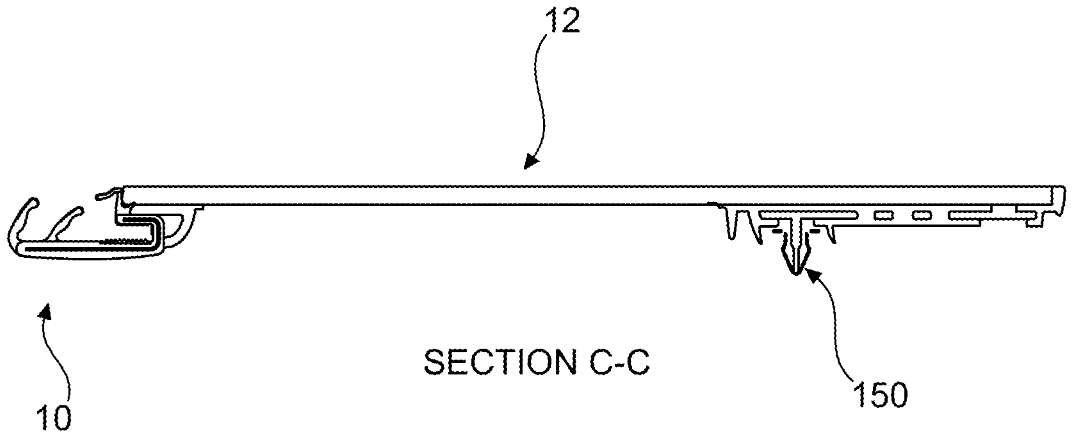
FIG. 23 is a cross sectional view along line C-C of FIG. 23.

FIG. 23 is a cross sectional view along line C-C of FIG. 21 and shows that the second profile 20 of FIG. 6 is optional. It could be eliminated and replaced by a few (two to four for instance) retention clips 150.

In all the embodiments, the esthetic appearance of the window module may be enhanced by lying flush the outside surfaces 12*a*, 14*a* of the fixed and movable window panes 12, 14. The exterior surfaces 12*a*, 14*a* of the panes 12, 14 may be therefore substantially coplanar. These surfaces 12*a*, 14*a* mays also be flush with the exterior surface 44*c* (cf. FIGS. 8 to 10*f*), and/or with the end of the leg 160 (FIGS. 8 to 10*f*), and/or with the end of the third portion 142*c* of the over-molding material 142 (FIGS. 10*g* and 10*h*).

The invention claimed is:

1. An encapsulated fixed window module for a motor vehicle, comprising:

a fixed window pane having an exterior surface, an interior surface, and a peripheral edge extending between said exterior and interior surfaces, at least one division post extending along at least a portion of said peripheral edge, said division post comprising a first longitudinal profile which is U-shaped in cross section, said division post having an exterior wall, an interior wall, and a lateral wall connecting said exterior and interior walls, said exterior wall includes a first part and a second part, the first part extending between said lateral wall and the second part, the second part is applied directly onto the interior surface of the fixed window pane, said first profile defining a longitudinal groove configured to receive a guide carried by a movable window pane, said exterior wall facing said interior surface, and an over-molded material securing said first profile to said fixed window pane, wherein said over-molded material is in contact with at least one protruding lip which is located between said exterior wall and said interior surface, said at least one protruding lip being elastically deformable from a first unconstrained position to a second constrained position in which said at least one protruding lip is elastically deformed, and wherein said at least one protruding lip is compressed between the exterior wall of said division post and the interior surface of said fixed window pane to adopt said second position, and wherein said second part of the exterior wall carries a protruding leg which is perpendicular to said exterior wall and which is in abutment against said peripheral edge.

2. The encapsulated fixed window module as claimed in claim 1, wherein said at least one protruding lip is carried by said exterior wall.

3. The encapsulated fixed window module as claimed in claim 1, wherein said at least one protruding lip is carried by said fixed window pane and connected to said interior surface.

4. The encapsulated fixed window module as claimed in claim 1, wherein said at least one protruding lip includes two, three or four adjacent protruding lips, each of said adjacent protruding lips being elastically-deformable.

5. The encapsulated fixed window module as claimed in claim 1, wherein said exterior wall is located at a first distance from said interior surface, said first distance being measured in a direction which is perpendicular to said interior surface, wherein said at least one protruding lip has a first height in said first position and a second height in said second position, said first and second heights being measured in a direction which is perpendicular to said interior surface, and wherein said second height is equal to said first distance, and said first height is greater that said second height and said first distance.

6. The encapsulated fixed window module as claimed in claim 1, wherein said at least one protruding lip has a cross sectional curved shape and comprises a concave side which is oriented towards the lateral wall and an opposite convex side.

7. The encapsulated fixed window module as claimed in claim 6, wherein said convex side is aligned and flush with a convex surface of said peripheral edge.

8. The encapsulated fixed window module as claimed in claim 1, wherein an empty space is defined between said at least one protruding lip and said interior surface.

9. The encapsulated fixed window module as claimed in claim 7, wherein an empty space is defined between said opposite convex side and said interior surface.

10. The encapsulated fixed window module as claimed in claim 1, wherein said at least one protruding lip has a cross sectional straight shape and extends perpendicularly to said interior surface.

11. The encapsulated fixed window module as claimed in claim 1, wherein said at least one protruding lip comprises a securing base and at least one flexible lip extending from said securing base.

12. The encapsulated fixed window module as claimed in claim 1, wherein said at least one protruding lip is overmolded onto said interior surface or onto said exterior wall.

13. The encapsulated fixed window module as claimed in claim 1, wherein said at least one protruding lip is made of a material of said exterior wall or from one of materials of said exterior wall.

14. The encapsulated fixed window module as claimed in claim 1, wherein said at least one protruding lip is located at a first end of said exterior wall which is opposite to said lateral wall, or is located at a second end of said exterior wall which is opposite to said first end.

15. The encapsulated fixed window module as claimed in claim 1, wherein said protruding leg carries a first sealing lip which is configured to abut against a peripheral edge of said movable window pane.

16. The encapsulated fixed window module as claimed in claim 15, wherein said first sealing lip has a concave surface which is oriented outwardly and opposite to said at least one division post.

17. The encapsulated fixed window module as claimed in claim 1, wherein said over-molded material comprises a first portion extending between said exterior wall and said interior surface and a second portion extending between said lateral wall and said interior surface, said first and second portions being connected one to the other, and wherein said second portion is in contact with said at least one protruding lip.

18. The encapsulated fixed window module as claimed in claim 1, wherein said division post is extruded and said at least one protruding lip is coextruded with the division post.

19. The encapsulated fixed window module as claimed in claim 18, wherein at least one sealing lip is further coextruded with the division post.

20. A glass run comprising an encapsulated fixed window module as claimed in claim 1 and first and second extruded segments, said first extruded segment being parallel to said division post, said second extruded segment extending between said encapsulated fixed window module and said first extruded segment and having a first end connected by overmolding to an upper end of said division post and a second end connected by overmolding to an upper end of said first extruded segment.

21. A motor vehicle, comprising at least one encapsulated fixed window module as claimed in claim 1.

22. The motor vehicle as claimed in claim 21, which comprises a door including a door frame, a movable window pane, and said encapsulated fixed window module, said movable window pane having an exterior surface, an interior surface, and a peripheral edge extending between said exterior and interior surfaces, wherein said exterior surfaces of said encapsulated fixed window module and of said movable window pane are substantially coplanar or flush.

23. The motor vehicle as claimed in claim 22, wherein both exterior surfaces of said encapsulated fixed window module and of said movable window pane are further substantially coplanar or flush with a portion of a first sealing lip interposed between both said peripheral edge of said encapsulated fixed window module and of said movable window pane.

24. A motor vehicle, comprising at least one glass run as claimed in claim 20.

25. The encapsulated fixed window module as claimed in claim 1, wherein said at least one protruding leg comprises a single securing base and a plurality of flexible lips connected to said single securing base.

26. The encapsulated fixed window module as claimed in claim 1, wherein said at least one protruding leg is interposed in a gap between the peripheral edge of said fixed window pane and the peripheral edge of said movable window pane.

27. The encapsulated fixed window module as claimed in claim 1, wherein said at least one protruding leg is made of a same material as a main material of the first longitudinal profile, and the first sealing lip is made of a material softer than the main material.

28. The encapsulated fixed window module as claimed in claim 1, wherein said at least one protruding leg and said at least one protruding lip are made of a same material as a main material of the first longitudinal profile, and the first sealing lip is made of a material softer than the main material.

29. The encapsulated fixed window module as claimed in claim 1, wherein said at least one protruding leg and said at least one protruding lip are made of a first material which is different from a second material of the division post.

30. The encapsulated fixed window module as claimed in claim 1, wherein the protruding leg is formed integrally with the second part of the exterior wall and has a thickness greater than said second part.

* * * * *